US 9,277,266 B2

(12) United States Patent
Riedl et al.

(10) Patent No.: US 9,277,266 B2
(45) Date of Patent: Mar. 1, 2016

(54) APPARATUS AND METHODS FOR NETWORK VIDEO RECORDING

(75) Inventors: Steven Riedl, Superior, CO (US); Bryan Santangelo, Tulsa, OK (US); Charles Hasek, Broomfield, CO (US); Craig Mahonchak, Broomfield, CO (US)

(73) Assignee: TIME WARNER CABLE ENTERPRISES LLC, New York, NY (US)

( * ) Notice: Subject to any disclaimer, the term of this patent is extended or adjusted under 35 U.S.C. 154(b) by 474 days.

(21) Appl. No.: 12/406,881

(22) Filed: Mar. 18, 2009

(65) Prior Publication Data

US 2010/0242079 A1 Sep. 23, 2010

(51) Int. Cl.
| | |
|---|---|
| H04N 7/173 | (2011.01) |
| H04N 21/274 | (2011.01) |
| H04N 21/2225 | (2011.01) |
| H04N 21/2747 | (2011.01) |
| H04N 21/81 | (2011.01) |
| H04N 21/472 | (2011.01) |

(52) U.S. Cl.
CPC ......... *H04N 21/274* (2013.01); *H04N 7/17318* (2013.01); *H04N 21/2225* (2013.01); *H04N 21/2747* (2013.01); *H04N 21/47202* (2013.01); *H04N 21/47214* (2013.01); *H04N 21/812* (2013.01); *H04N 21/47217* (2013.01)

(58) Field of Classification Search
CPC ............ H04N 21/274; H04N 21/2747; H04N 21/47217
USPC ...................... 725/32–36, 86, 87, 91–93, 105, 725/114–117, 96
See application file for complete search history.

(56) References Cited

U.S. PATENT DOCUMENTS

| | | | | |
|---|---|---|---|---|
| 6,487,721 | B1 * | 11/2002 | Safadi | 725/36 |
| 7,017,174 | B1 * | 3/2006 | Sheedy | 725/87 |
| 7,555,006 | B2 * | 6/2009 | Wolfe et al. | 725/116 |
| 7,602,820 | B2 | 10/2009 | Helms et al. | |
| 7,908,626 | B2 | 3/2011 | Williamson et al. | |
| 2002/0154885 | A1 * | 10/2002 | Covell et al. | 386/1 |
| 2002/0164151 | A1 * | 11/2002 | Jasinschi et al. | 386/69 |
| 2003/0056217 | A1 | 3/2003 | Brooks | |
| 2003/0093790 | A1 * | 5/2003 | Logan et al. | 725/38 |
| 2003/0208763 | A1 | 11/2003 | McElhatten et al. | |

(Continued)

OTHER PUBLICATIONS

CableLabs® Asset Distribution Interface (ADI) Specification, Version 1.1, MD-SP-ADI1.I03-040107, Jan. 7, 2004. pp. 1-26.

*Primary Examiner* — Jeremy Duffield
(74) *Attorney, Agent, or Firm* — Gazdzinski & Associates, PC

(57) ABSTRACT

Apparatus and methods for the capture and delivery of content over a network. In one embodiment, the network comprises a cable television network, and the apparatus comprises a local server which stores, processes and assembles content prior to its delivery to a VOD server, thus obviating the need for superfluous VOD storage. This approach also facilitates various pre-streaming processing in a video recording (e.g., nPVR) system, and gives a network operator dynamic control over local playlists. In another embodiment, the local server of the improved system obviates the need for a VOD server in the nPVR system. One or more content libraries adapted to facilitate nPVR content access across one or more regions of a broadcast network are also disclosed. Secondary content (e.g., promotions, advertisements, etc.) can also be selectively inserted into nPVR content. Various access, business or operational rules and methods implementing the foregoing are also described.

39 Claims, 23 Drawing Sheets

(56) References Cited

U.S. PATENT DOCUMENTS

| | | |
|---|---|---|
| 2004/0010807 A1* | 1/2004 | Urdang et al. ............... 725/136 |
| 2004/0244058 A1 | 12/2004 | Carlucci et al. |
| 2004/0255336 A1* | 12/2004 | Logan et al. ................. 725/135 |
| 2005/0034171 A1 | 2/2005 | Benya |
| 2005/0060742 A1* | 3/2005 | Riedl et al. ..................... 725/34 |
| 2005/0108768 A1* | 5/2005 | Deshpande et al. ......... 725/115 |
| 2005/0152397 A1* | 7/2005 | Bai et al. ....................... 370/468 |
| 2006/0130107 A1 | 6/2006 | Gonder et al. |
| 2006/0130113 A1 | 6/2006 | Carlucci et al. |
| 2007/0033531 A1 | 2/2007 | Marsh et al. |
| 2007/0124416 A1* | 5/2007 | Casey et al. .................. 709/217 |
| 2007/0217436 A1 | 9/2007 | Markley et al. |
| 2008/0209464 A1* | 8/2008 | Wright-Riley ................. 725/25 |
| 2008/0235746 A1 | 9/2008 | Peters et al. |
| 2009/0037960 A1* | 2/2009 | Melby ............................. 725/87 |
| 2009/0210899 A1 | 8/2009 | Lawrence-Apfelbaum et al. |
| 2009/0217326 A1 | 8/2009 | Hasek et al. |
| 2009/0274212 A1* | 11/2009 | Mizutani et al. ......... 375/240.12 |

* cited by examiner

APPARATUS AND METHODS FOR NETWORK VIDEO RECORDING

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

1. Field of the Invention

In one exemplary aspect, the invention relates to the fields of content storage and delivery over one or more networks, such as for example cable television or satellite networks.

2. Description of Related Technology

Modern content-based networks (e.g., cable television or satellite) provide their subscribers with a broad variety of content in a number of different formats (e.g., digitally encoded according to different encoding schemes, low- and high-definition, etc.) via a number of different delivery paradigms (e.g., broadcast, pay-per view, on-demand, etc.) and with various feature sets (e.g., premises digital recording or DVR, networked personal video recording, etc.). Each of these facets are now described in greater detail.

Digital Encoding

With the advent of digital communications technology, television program streams are now transmitted in digital format. For example, Digital Satellite System (DSS), Digital Broadcast Services (DBS), and Advanced Television Standards Committee (ATSC) program streams are uniformly digitally encoded or formatted according to a prescribed standard. One such prevailing standard is the Moving Pictures Experts Group 2 (MPEG-2) standard. The MPEG-2 standard specifies, inter alia, the methodologies for video and audio data compression and encoding, allowing for multiplexing multiple programs with different video and audio feeds in a transport stream traversing a single transmission channel. The digital receiver of a digital set-top box (DSTB) or other such device is then used to decode the MPEG-2 encoded transport stream, and extract the desired program therefrom.

In accordance with the MPEG-2 standard, video data is compressed based on a sequence of groups of pictures (GOPs), made up of three types of picture frames: coded picture frames ("I-frames"), forward predictive frames ("P-frames") and bilinear frames ("B-frames"). Each GOP may, for example, begin with an I-frame which is obtained by spatially compressing a complete picture using discrete cosine transform (DCT). As a result, if an error or a channel switch occurs, it is possible to resume correct decoding at the next I-frame.

The GOP may represent additional frames by providing a much smaller block of digital data that indicates how small portions of the I-frame, referred to as macroblocks, move over time.

An I-frame is typically followed by multiple P- and B-frames in a GOP. Thus, for example, a P-frame occurs more frequently than an I-frame by a ratio of about 3 to 1. A P-frame is forward predictive and is encoded from the I- or P-frame that precedes it. A P-frame contains the difference between a current frame and the previous I- or P-frame.

A B-frame compares both the preceding and subsequent I- or P-frame data. The B-frame contains the average of matching macroblocks or motion vectors. Because a B-frame is encoded based upon both preceding and subsequent frame data, it effectively stores motion information.

Thus, MPEG-2 achieves its compression by assuming that only small portions of an image change over time, making the representation of these additional frames extremely compact. Although GOPs have no relationship between themselves, the frames within a GOP have a specific relationship which builds off the initial I-frame.

The compressed video and audio data are carried by continuous elementary streams, respectively, which are broken into access units or packets, resulting in packetized elementary streams (PESs). These packets are identified by headers that contain time stamps for synchronizing, and are used to form MPEG-2 transport streams. For digital broadcasting, multiple programs and their associated PESs are multiplexed into a single transport stream. A transport stream has PES packets further subdivided into short fixed-size data packets, in which multiple programs encoded with different clocks can be carried. A transport stream not only comprises a multiplex of audio and video PESs, but also other data such as MPEG-2 program specific information (sometimes referred to as metadata) describing the transport stream. The MPEG-2 metadata may include a program associated table (PAT) that lists every program in the transport stream. Each entry in the PAT points to an individual program map table (PMT) that lists the elementary streams making up each program. Some programs are open, but some programs may be subject to conditional access (encryption) and this information is also carried in the MPEG-2 transport stream, possibly as metadata.

The aforementioned fixed-size data packets in a transport stream each carry a packet identifier (PID) code. Packets in the same elementary streams all have the same PID, so that a decoder can select the elementary stream(s) it needs and reject the remainder. Packet-continuity counters may be implemented to ensure that every packet that is needed to decode a stream is received.

DVR, PVR and nPVR

Digital video recorders (DVRs) and personal video recorders (PVRs) are devices which record video content, in digital format, to a disk drive or other medium. The use of such devices is now ubiquitous, and they provide conveniences to TV viewers such as e.g., (i) allowing a user to record a program for later review, (ii) allowing a user to record every episode of a program for a period, and/or (iii) automatically recording programs for the user based on viewing habits and preferences. Further, the presentation of the recorded programming content can be manipulated by exercising rewind, pause, play, stop, and fast-forward functions hereinafter referred to as "trick mode" functions) in such DVRs and PVRs.

A network PVR (nPVR) is a form of a PVR which can store content on a remote network device instead of a local hard disk. The nPVR allows the user to perform the analogous DVR functions through use of a network entity or process, rather than a local DVR at the user premises, thereby ostensibly relieving the user of the burdens of ownership and maintenance of a DVR unit.

Numerous nPVR architectures exist. See, e.g., co-owned U.S. patent application Ser. No. 10/302,550, filed Nov. 22, 2002, issued as U.S. Pat. No. 7,073,189 on Jul. 4, 2006,and entitled "Program Guide and Reservation System for Network Based Digital Information and Entertainment Storage and Delivery System", incorporated by reference herein in its entirety, which discloses one exemplary network architecture and functionalities for implementing nPVR service. Generally, nPVR systems employ Video on-demand (VOD) or similar architecture to provide content storage and retrieval in a network. Typical VOD architectures will be discussed in greater detail below.

Start-Over

So called "start-over" is a feature offered to some network users which allows the user to jump to the beginning of a program in progress without any preplanning or in-home recording devices (e.g., DVR). Start-over is enabled by a software upgrade to the existing video on-demand (VOD) platform, and to the installed base of digital set top boxes. In other words, the start-over feature utilizes an nPVR system to maintain content which users may request, and delivers content in a manner similar to VOD. The start-over system instantaneously captures live television programming for immediate, on-demand viewing. Start-over functionality is the result of MSO-initiated nPVR storage of broadcast programs in real time. In other words, the MSO determines which programs will be start-over enabled, and stores this content as it is broadcast to an nPVR which is accessible by the various client devices utilizing a mechanism similar to VOD (discussed below).

When tuning to a start-over enabled show in progress, customers are alerted to the feature through an on-screen prompt. By pressing appropriate remote control buttons, the program is restarted from the beginning. Under one type of approach, start-over enabled programs may only be restarted within the shows' original telecast window (i.e., during the time window set for broadcasting the program), and may not be restarted after the show has finished broadcast. Thus, the start-over feature generally functions as an nPVR for pre-defined content (i.e., content on a start-over enabled channel) during a predefined period (i.e., the broadcast window).

Co-owned, U.S. patent application Ser. No. 10/913,064, filed Aug. 6, 2004, and entitled "Technique for Delivering Programming Content Based on a Modified Network Personal Video Recorder Service", incorporated herein by reference in its entirety, discloses exemplary network architecture and functionalities for implementing start-over service within a content-based (e.g., cable) network. As noted above, start-over services generally employ a VOD or similar architecture to provide content storage and retrieval.

VOD Systems

The provision of "on-demand" (OD) services, such as e.g., video on-demand or VOD, is well known in the prior art. In a typical configuration, the VOD service makes available to its users a selection of multiple video programs that they can choose from and watch over a network connection with minimum setup delay. At a high level, a VOD system comprises: (i) one or more VOD servers that pass and/or store the relevant content; (ii) one or more network connections that are used for program selection and program delivery; and (iii) customer premises equipment (CPE) to receive, decode and present the video on a display unit. The content is typically distributed to the CPE over a Hybrid Fiber Coaxial (HFC) or satellite network, which may include e.g., dense wave division multiplexed (DWDM), coaxial, wireless (e.g., satellite or millimeter wave), and other types of bearer media.

Several different network architectures have evolved for deploying VOD services. These architectures range from fully centralized (e.g., VOD servers at a central location) to fully distributed (e.g., multiple copies of content distributed on VOD servers very close to customer premises; i.e., at the network "edge"), as well as various other network topographies there between. Since most cable television networks today consist of optical fiber towards the core of the network which are connected to coaxial cable networks towards the edge, VOD transmission network architectures also consist of a mixture of optical fiber and coaxial cable portions.

While the architectural details of how video is transported in the core HFC network can be different for each VOD deployment, each generally will have a transition point where the video signals are modulated, upconverted to the appropriate RF channel, and sent over the coaxial segment(s) of the network Depending on the topology of the individual cable plant, this could be performed at a node, hub or a headend. The coaxial cable portion of the network is variously referred to as the "access network" or "edge network" or "last mile network."

A typical prior art VOD architecture useful for prior art nPVR and start-over functionality comprises sending content through various staging and segmenting functions, then on to a VOD server. At the staging and segmenting functions, the content is spliced on valid GOP boundaries, or I-frames. The spliced content is then examined, and a reference data file is created to describe it. However, current splicing functions are often inexact due to the fact that the splicing is occurring on content running open GOPs; this ultimately leads to the creation of data files which relate to portions of the content that have been removed, or content streams having other artifacts or problems. The VOD server uses the data file as a guide to where the segments of the content are located, and constructs a content stream inserting secondary content (e.g., advertisements from an advertisement playlist) in-between the segments.

Associated with the VOD server is a cataloging entity, which maintains records regarding the content stored on (and available for streaming from) the VOD server. In many prior art systems, the cataloging entity is not equipped to manage data regarding the massive quantity of content stored therein. Further, as assets are removed from VOD availability, prior art cataloging entities are often unable to function as intended.

Exemplary nPVR System Utilizing VOD—

A typical prior art VOD architecture providing storage and access to content is given in FIG. 1a. This architecture is utilized for both user-initiated and MSO-initiated nPVR.

As illustrated, audio/video content is received to the MSO. The MSO sends the content to a staging processor 102 adapted to "stage" content for transmission over the network. The staging processor 102 is an entity adapted to prepare content for segmenting and/or for transmission to a VOD server 105 for streaming to one or more users.

Content is prepared for transmission and/or segmenting by processing through various staging processes, or software applications adapted to run on the digital processor associated with the staging processor 102. The processes effected by the staging processor 102 include, inter alia, at least one segmenting process 104. The segmenting process 104 divides the content video feed on valid GOP boundaries, or I-frames.

Segmenting the video feed at the segmenting process 104 results in content which is segmented based on a schedule. The segmented content is then examined by a business management process (BMS) 107. The management process 107, inter alia, creates a data file regarding the segmented content. The data file gives metadata regarding the content and "points" to the segmented portions of the content on the disk. However, current segmenting processes 104 of the type illustrated in FIG. 1a are often imprecise (e.g., splice points not precisely on the correct frame boundaries), and may result in instances where the management process 107 refers to content that is no longer part of the file, and/or contains other "glitches". These conditions cause problems with video received by a user including e.g., "macroblocking" (an effect akin to pixelation), and/or segments of the video stream having no video (i.e., being blank).

Other issues associated with prior art segmentation techniques include overflow or underflow of buffer levels and "closed" GOPs. In an MPEG buffering scheme, certain past and future pictures need to be maintained in a buffer. When switching streams it is possible to overflow or underflow this buffer if the levels are not managed correctly. A GOP in MPEG2 refers to the distance between reference frames that can be completely rendered with only the information in that frame; similar to a still photo compression such as JPEG. Other frames in between the reference or I-frames have some forward or backwards references. It is possible in MPEG to reference frames beyond the I-frames. If a stream is cut where a further frame beyond the next I-frame is needed, visual errors can be introduced.

Once the management process 107 has created a data file for the content, it is sent to a VOD server 105. As described in greater detail subsequently herein, the VOD server 105 stores the content and/or data on hard disks; the VOD server 105 streams the content from these disks as well. The VOD server 105 is also sent a playlist of advertisements.

The VOD server 105, therefore, will receive the segmented content as well as a file indicating where the various portions of the content are and in what order they should be arranged; the VOD server also receives advertisements for insertion into the segmented content.

FIG. 1b is illustrative of a simplified prior art segmented content file 120 and advertisement playlist 130. As noted above, the content is segmented according to a schedule thus resulting in any number (n) content segments 122. The advertisement playlist 130 comprises some number (x) of advertisement segments 132. The number x of advertisement segments 132 may be e.g., equal to the number n of content segments 122; alternatively, the number of advertisement segments 132 may be one more (n+1) or one less (n−1) than the number of content segments 122.

When a CPE 106 requests the content from the VOD server 105 via the network 101, the VOD server 105 utilizes the data file (not shown) created by the management process 106 to find the start 124 and end 126 points of the content segments 122, and the start 134 and end 136 points for the advertisement segments 132. The first content segment 122a is delivered to the user, and at its end point 126a, the VOD server 105 sends the first advertisement segment 132a. At the end point 136a of the first advertisement segment 132a, the VOD server 105 sends the second content segment 122b. At the end point 126b of the second content segment 122b, the second advertisement segment 132b is sent. This pattern continues until the last of the content segments 122n and/or the last of the advertisement segments 132x have been presented to the user. The user will receive a seamless content-plus-advertisement stream 140 comprised of the various segments 122a, 132a, 122b, 132b . . . 122n, 132x sent. It is recognized that the first segment sent to the user may comprise either the first advertisement or the first content segment, still utilizing the pattern outlined above.

Content and data storage within the previously described prior art VOD system requires high performance fiber channels or small computer system interface (SCSI) disks which have the disadvantages of being expensive and small in size (typically 15K RPM). In other words, the VOD system is a full complex, so the storage is tightly coupled to the streaming capabilities. The VOD complex controls the content once received, and thus disallows the multiple systems operator (MSO) to change the content stream in any way, except by providing a new content file. The foregoing approach also generally results in VOD server vendors (i.e., companies who provide and maintain VOD servers for MSO utilization) charging their clients (MSOs) comparatively high rates for storage and streaming of content at the VOD server.

In an nPVR system (and/or a start-over system), MSOs ingest a large quantities of content to the VOD servers for storage and streaming, so as to offer nPVR features (including e.g., start-over) on a variety of channels and/or for a variety of programs. Doing so quickly becomes exceedingly expensive. Further, given that start-over capabilities are made available on a channel-by-channel basis, a large portion of the content stored and available for streaming from the VOD server is often never requested, such as during times when there are fewer viewers (e.g., between 12 midnight and 6 am). Thus, in the present systems, even when content is not requested, it must still be sent to the VOD server as discussed above.

Other inefficiencies or undesirable aspects in these prior art systems lie in the fact that the MSO has no control over the content once ingested by the VOD server. In other words, the MSO is not able to "clean up" portions of the content which were imprecisely segmented or processed (discussed above), because the content is sent directly from the segmenting process to the VOD server. The MSO is also unable to insert advertisements or other secondary content different from those given to the VOD server in the advertisement playlist, or in a different order than presented therein.

Additionally, using the foregoing approach, the BMS 107 is loaded heavily by having to create all the metadata for the ingested content.

Hence, based on the foregoing, there is a need for improved apparatus and methods for efficiently making content available in an nPVR (and/or start-over) system via an on-demand or other network server. Such apparatus and methods would in one embodiment be adapted to store content locally, such as via larger and more cost effective (e.g., COTS) mass storage means. Local storage of content would also optionally provide mechanisms for the addition of secondary content, and other types of content manipulation (such as the aforementioned "clean up" or segmentation or other processing artifacts).

Additionally, such apparatus and methods would in one embodiment reduce the amount of content unnecessarily ingested to the streaming server, and provide more efficient and effective cataloging processes. Historical storage (e.g., storing content relating to past broadcasts for a period of time) would also be improved, thereby providing network users additional viewing options.

SUMMARY OF THE INVENTION

The present invention satisfies the foregoing needs by providing improved apparatus and methods for the storage and streaming of content in a recording and delivery (e.g., nPVR) system.

In a first aspect of the invention, a method for the delivery of content is disclosed. In one embodiment, the delivery is accomplished via a network personal video recorder in a content based network, and the method comprises: ingesting the content; processing the content, the processing comprising at least one step for segmenting the content into a plurality of elements; storing the segmented content elements; receiving a request for at least a portion of the content; generating a content stream using at least a portion of the content elements; and sending the content stream to one or more users.

In one variant, the act of segmenting comprising cutting the content stream at one or more I-frame boundaries.

In another variant, the act of generating a content stream comprises at least assembling the segmented content elements with one or more advertisement segments. The act of generating a content stream further comprises e.g., transcoding the assembled content elements and advertisement segments.

In another variant, the method further comprises generating metadata regarding the stored content elements. The one or more advertisement segments are selected based at least in part on a comparison of metadata associated with the advertisement segments and the metadata regarding the stored content elements.

In a further variant, the act of sending the content stream to one or more users comprises sending the content stream to an on-demand server.

On still another variant, the act of sending the content stream to one or more users comprises sending the content stream to a content library.

In another variant, the act of ingesting the content is performed substantially in response to the receipt of at least one user request.

Alternatively, the act of ingesting the content is performed based at least in part on the receipt of at least a cable network provider request.

In yet another variant, the act of storing comprises storing the segmented content elements on a commercial off-the-shelf (COTS) storage device.

In a second aspect of the invention, a system for the acquisition and distribution of content in a content based network is disclosed. In one embodiment, the system comprises: at least one processing entity, the processing entity adapted to: acquire content; and segment the acquired content; at least one storage entity, the storage entity adapted to store the segmented content; at least one local server entity, the server entity adapted to: generate a content stream using at least portions of the stored content; and distribute the content stream via the network.

In one variant, the system further comprises one or more on-demand servers, the on-demand servers adapted to receive and transmit the content stream to at least one CPE associated with the network.

In another variant, the system further comprises at least one content library, the content library adapted to: receive a request for content from at least one CPE associated with the network; and establish a mechanism for the delivery of the requested content to the at least one CPE.

In another variant, the mechanism for the delivery of the requested content comprises the content library requesting the requested content from the at least one local server entity, and delivering the requested content to the at least one CPE.

In another variant the mechanism for the delivery of the requested content comprises the content library forwarding the request to at least one local server entity, and enabling the at least one local server entity to communicate with the at least one CPE.

In still another variant the act of segmenting comprises dividing the content stream at one or more I-frame boundaries.

In yet another variant, the act of generating a content stream comprises at least assembling the segmented content with one or more advertisement segments.

In still yet another variant, the act of generating a content stream further comprises transcoding the assembled content and advertisement segments.

In still a further variant, the at least one local server entity is further adapted to generate metadata regarding the stored content and wherein the one or more advertisement segments are selected based at least in part on a comparison of metadata associated with the advertisement segments and metadata regarding the stored content.

In another variant, the act of distributing the content stream comprises sending the content stream to an on-demand server.

In still another variant, the act of distributing the content stream comprises sending the content stream to at least one CPE associated with the network.

In a third aspect of the invention an apparatus for the storage and distribution of content is disclosed. In one embodiment, an apparatus for the storage and distribution of content in an nPVR system of a content based network, the apparatus comprises: an interface, the interface adapted to enable the apparatus to receive and distribute the content; a storage entity, the storage entity adapted to store the content; and a processing entity, the processing entity adapted to run at least one computer program thereon, the computer program adapted to enable the apparatus to generate a content stream based at least in part on the content.

In one variant, the storage entity comprises one or more commodity-based storage entities. The one or more commodity-based storage entities comprise for example a hardware-assisted Flash memory-based storage devices, or a DRAM based server device.

In another variant, the content comprises content segments which have been cut at I-frame boundaries. The act of generating the content stream comprises e.g., Joining the content segments to advertisement segments.

In still another variant, the processing entity is further adapted to run at least one software application configured to transcode the joined content segments and advertisement segments. The processing entity may farther be adapted to run at least one software application configured to generate metadata regarding the stored content and wherein the one or more advertisement segments are selected based at least in part on a comparison of metadata associated with the advertisement segments and metadata regarding the stored content.

In yet another variant, the act of distributing the content comprises sending the content to an on-demand server. The act of distributing the content may comprise sending the content to another apparatus for the storage and distribution of content.

In another variant, the act of distributing the content stream comprises sending the content stream to at least one CPE associated with the network.

In a fourth aspect of the invention a computer readable apparatus is disclosed. In one embodiment the computer readable apparatus comprises media adapted to contain a computer program having a plurality of instructions, the plurality of instructions which, when executed: ingest a plurality of content; process the content, the processing comprising at least one step for segmenting the content; store the segmented content; receive a request for the stored content from a requesting entity; generate a content stream based at least in part on the segmented content; and send the content stream the requesting entity.

In one variant, the act of segmenting comprises cutting the content stream at one or more I-frame boundaries.

In another variant, the act of generating a content stream comprises at least assembling the segmented content with one or more advertisement segments.

In still another variant, the act of generating a content stream further comprises transcoding the assembled content and advertisement segments.

In still another variant, the method further comprises generating metadata regarding the stored content and wherein the one or more advertisement segments are selected based at least in part on a comparison of metadata associated with the advertisement segments and metadata regarding the stored content.

In a fifth aspect of the invention, a method for processing content is disclosed. In one embodiment, the method comprises: acquiring the content from a segmentation process directly to a file storage device, the storage device further comprising an file server configured to export files from the storage device to a distribution server; processing the content to correct one or more deficiencies therein, the processing creating corrected content segment files; and exporting at least a portion of the corrected content storage files to the distribution server.

In one variant, the acquiring to a file storage device comprises acquiring the content to a single server with a plurality of storage elements, the storage elements comprising at least one of: (i) FLASH memory; and (ii) DRAM.

In another variant, the acquiring to a file storage device comprises acquiring the content to a Storage Area Network (SAN).

In a further variant, the exporting comprises use of a common Internet file system (CIFS) protocol.

In still another variant, the processing to correct one or more deficiencies comprises processing to correct imprecise frame boundary segmentation performed by the segmentation process.

In a sixth aspect of the invention, a method of generating content for distribution within a content-based network is disclosed. In one embodiment, the network comprises a cable television network, and the method comprises: acquiring a single network content stream for service of multiple advertising zones within the network; storing content acquired via the single content stream; marking the stored content with at least one pointer; and creating a new file that has descriptors that identify: (i) content elements within the stored content; and (ii) one or more advertisement files.

In one variant, the descriptors comprise pointers to content storage elements provided from a supplier of the content.

In a second variant, the one or more advertisement files comprise: (i) linear broadcast for a designated advertising zone, or (ii) a set of targeted advertisements.

In a seventh aspect of the invention, a method of doing business within a content based network is disclosed. In one embodiment, the method comprises selectively using local commodity-based mass storage for the storage of network PVR content, the local storage allowing for both customization of content streams delivered to users of the network and reduction of cost of delivery of the content streams.

Other features and advantages of the present invention will be immediately recognized by persons of ordinary skill in the art with reference to the attached drawings and detailed description of exemplary embodiments as given below.

BRIEF DESCRIPTION OF THE DRAWINGS

FIG. 9c is a functional block diagram illustrating one embodiment of a content library for use in the network configurations of FIGS. 9 and 9a.

DETAILED DESCRIPTION OF THE INVENTION

Figure 1A:
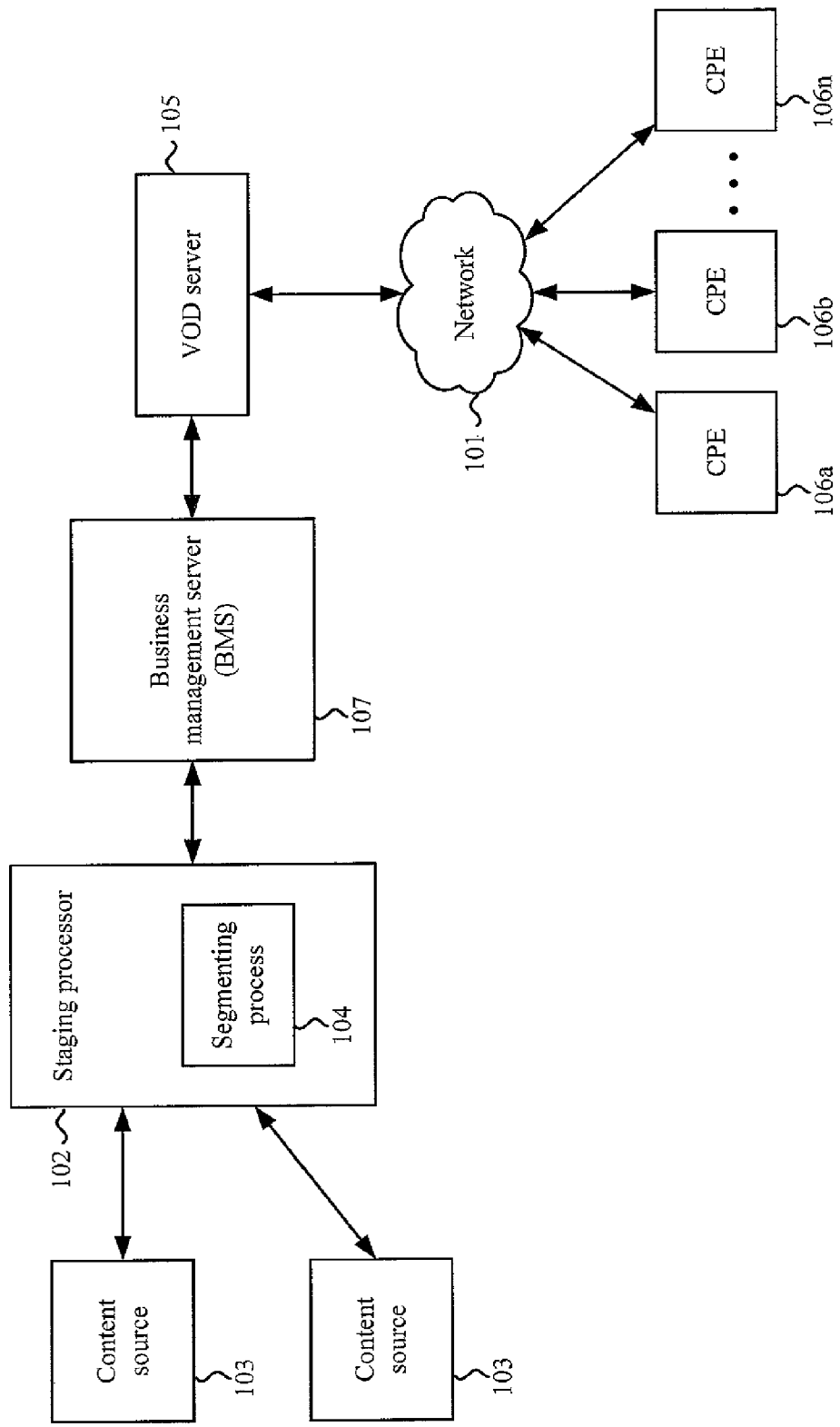
FIG. 1a is a functional block diagram illustrating an exemplary prior art VOD architecture useful for providing nPVR functionality.

Reference is now made to the drawings wherein like numerals refer to like parts throughout.

As used herein, the term "advertisement" and similar forms refers without limitation to any audio, visual, or promotion, message, or communication, whether for-profit or otherwise, that is perceptible by a human. Examples of advertisements include so-called "bumper" advertisements (advertisements inserted before or after a client requested program), "pause" advertisements presented when a client sends a pause control command to a video server or the like), or additional and replacement advertisements.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the Java™ environment. The unit of executable software may further comprise any one of specifications defining interactive television standards such as e.g., eTV and eBIF.

As used herein, the terms "client device" and "end user device" include, but are not limited to, set-top boxes (e.g., DSTBs), digital television sets, personal computers (PCs), and minicomputers, whether desktop, laptop, or otherwise, and mobile devices such as handheld computers, PDAs, personal media devices (PMDs, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AVC/H.264, AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The terms "Customer Premises Equipment (CPE)" and "host device" refer without limitation to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "head-end" refers generally to a networked system controlled by an operator (e.g., an MSO) that distributes programming to MSO clientele using client devices. Such programming may include any information source/receiver including, inter alia, free-to-air TV channels, pay TV channels, interactive TV, and the Internet. DSTBs may take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the terms "local" and "remote" refer generally and without limitation to devices, entities, or users that are serviced by substantially different communications channels. These terms are intended to be relative, and bear no physical or absolute reference or connotation as to the placement of the communication channels or the served device, entities or users. For example, a "local" network may comprise the MSO cable or satellite network, whereas a "remote" network may comprise the Internet or a LAN/WAN/MAN, the latter which may serve the very same premises.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs) Such digital processors may be contained on a single unitary IC die, or distributed across multiple components.

As used herein, the term "modem" refers to any kind of modulation or demodulation process or apparatus including without limitation cable (e.g., DOCSIS compliant) modems, DSL modems, analog modems, and so forth.

As used herein, the terms "MSO" or "multiple systems operator" refer to a cable, satellite, or terrestrial network provider having infrastructure required to deliver services including programming and data over those mediums.

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "QAM" refers to modulation schemes used for sending signals over cable networks Such modulation scheme might use any constellation level (e.g. QPSK, QAM-16, QAM-64, QAM-256 etc.) depending on details of a cable network. A QAM may also refer to a physical channel modulated according to said schemes.

As used herein, the term "server" refers to any computerized component, system or entity regardless of form which is adapted to provide data, files, applications, content, or other services to one or more other devices or entities on a computer network.

As used herein, the term "user interface" refers to, without limitation, any visual graphical, tactile, audible, sensory, or other means of providing information to and/or receiving information from a user or other entity. A user interface may comprise, for example, a computer screen display, touch screen, speech recognition engine, text-to-speech (TTS) algorithm, and so forth.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

In one salient aspect, the present invention provides, inter alia, improved apparatus and methods for the capture and delivery of nPVR content delivered over a content-based network. The capture and delivery of nPVR content in the present invention includes capture and delivery of user-initiated nPVR events (i.e., instances wherein a user requests to have content recorded to a network personal video recorder), as well as real-time MSO-initiated nPVR events (i.e., instances wherein the MSO determines which content will be recorded, in real time, to a network personal video recorder or other recording device).

In one embodiment, the improved apparatus of the present invention comprises: (i) one or more entities adapted to accomplish various content processing operations, and (ii) a "local" server adapted to store processed content locally, as well as to generate a metadata file regarding the stored content and assemble the content intermixed with advertisements or other secondary content. In one variant, the aforementioned local server is also adapted to stream content directly to the CPE of network users. Alternatively, the content may be delivered to a VOD server (such as upon user request), and sent from the VOD server to the users. The improved apparatus of the invention advantageously obviates the need for excessive (and often unused) VOD storage, and facilitates pre-streaming processing within the nPVR system.

In another embodiment, the apparatus of the invention also comprises one or more content libraries adapted to facilitate nPVR content access across one or more regions of a broadcast network. In one variant, a single content library is adapted to facilitate the delivery of content stored on one "local" server for transmission to other local servers of the network. In another variant, multiple libraries are disposed throughout the various regional networks, and optionally connected to a national-level library or global management entity.

The improved methods and apparatus of the invention provide other significant benefits including: (i) reduced costs associated with storage and streaming of content from VOD servers (i.e., instead of having to store large quantities of content at a VOD server, the local server will store content until requested); (ii) enablement of pre-streaming processing steps to ensure quality of content streamed to customers (e.g., transcoding/transrating, and selective secondary content insertion or modification without the use of a playlist at the VOD server); and (iii) significant improvements in reliability and delivered video quality.

The apparatus and methods of the present invention also allow for a network operator (e.g., MSO) to implement a dynamic or appendable content playlist without requiring a VOD vendor to make any of the desired changes, thereby advantageously affording the network operator more control and options with respect to playlist generation. The MSO can for example create a desired playlist out of storage components stored on its local storage (versus VOD vendor storage), and present this playlist as a virtual file or file pointer to the vendor system ("video pump") for playback.

Moreover the exemplary architectures of the present invention are not limited by the "push" capacity of the content segmentation process.

Code changes or upgrades to the segmentation process are also made possible by way of this architecture. Such updates or changes can increase performance (e.g., by recording all input directly to disk or other storage media, and then creating the file structures and pointers on top of that storage). In other words, the recording and segmenting process allows for easy creation of virtual files which point to a collection of blocks on disk storage. Once captured and accessible, different pointers may be made and/or the files may be manipulated by e.g., manipulating boundaries, inserting advertisements, or by posting capture control of the content. Additional processing may include cataloging (using metadata), because the content is no longer locked to what is stored, areas within the content may be identified and processed if needed. Furthermore, different segments of the content may be accessed (such as by facial recognition, pattern recognition, etc.) in real-time such as by centrally capturing the segments to cheaper disks. Other processing of the content may include insertion of a custom code or descriptive data. The data may be descriptive of the content by recognizing one or more breaking points and mapping these i.e., by taking signal definitions and embedding them. In another aspect of the invention, discontinuity between the segments may be "cleaned up" in real time, as the content is acquired.

Methods and apparatus for dynamic secondary content insertion (e.g., replacement of dated or geographically inappropriate advertisements or promotions, or insertion of targeted content) are also described.

An operational and business rules "engine" useful in implementing various operational or business goals is also disclosed, as well as various business methods which leverage the foregoing apparatus and capabilities.

DETAILED DESCRIPTION OF EXEMPLARY EMBODIMENTS

Exemplary embodiments of the apparatus and methods of the present invention are now described in detail. While these exemplary embodiments are described in the context of the aforementioned hybrid fiber coax (HFC) cable architecture having an multiple systems operator (MSO), digital networking capability, and plurality of client devices/CPE, the general principles and advantages of the invention may be extended to other types of networks and architectures where bandwidth allocation is required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system, or over a satellite or millimeter wave-based network.

It will also be appreciated that while described generally in the context of a network providing service to a consumer (i.e., home) end user domain, the present invention may be readily adapted to other types of environments including, e.g., commercial/enterprise, and government/military applications. Myriad other applications are possible.

It is also noted that while aspects of the invention are described primarily in the context of 6 MHz RF channels within the HFC network, the present invention is applicable to any frequency/bandwidth, such as for example 8 MHz channels.

Further, while generally described in terms of content delivery over discrete QAMs or channels, relevant portions of the invention can be used in conjunction with multiplexing algorithm and wideband tuner apparatus such as that described in co-owned and co-pending U.S. patent application Ser. No. 11/013,671 filed Dec. 15, 2004, and entitled "Method and Apparatus for Wideband Distribution of Content" which is incorporated herein by reference in its entirety.

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

Network Architecture—

Figure 2:
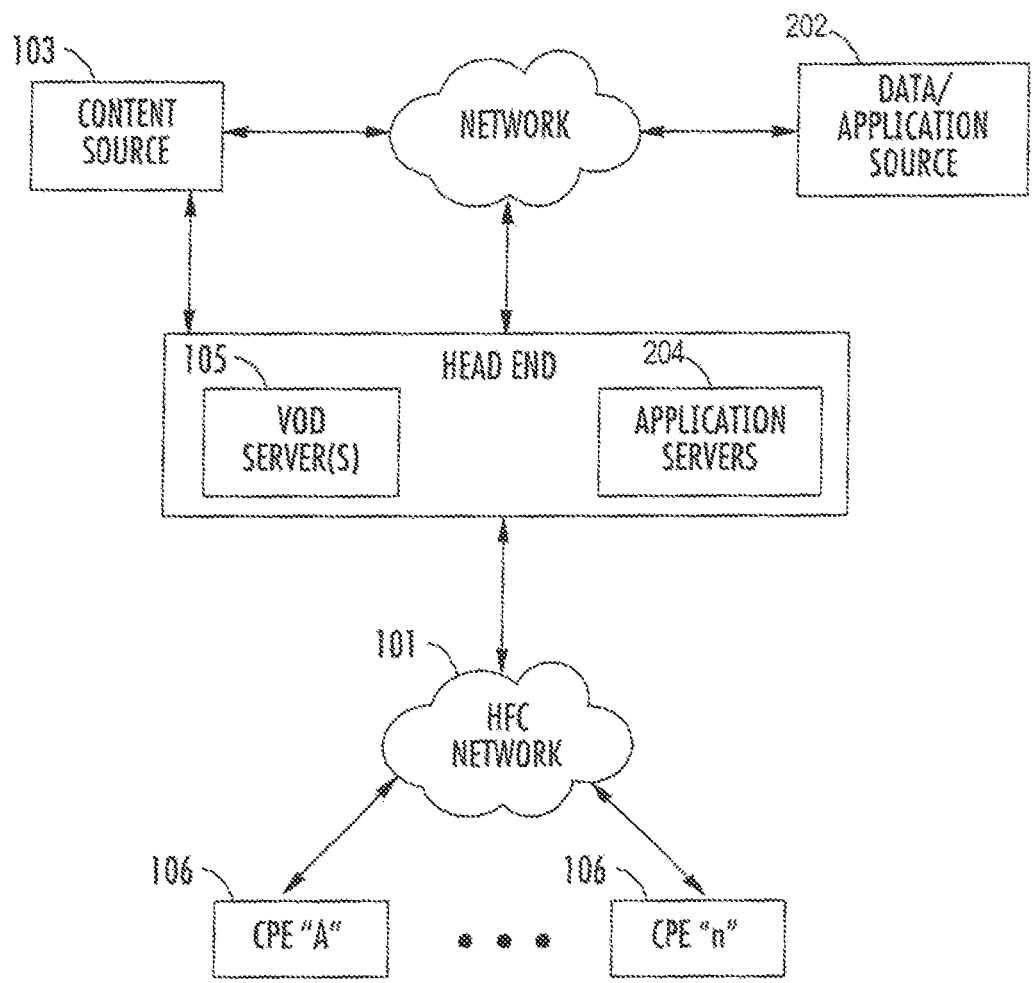
FIG. 2 is a functional block diagram illustrating an exemplary HFC cable network configuration useful with the present invention.

FIG. 2 illustrates a typical generalized content-based network configuration with which the improved nPVR apparatus and methods of the present invention may be used. The various components of the network 200 include (i) one or more data and application origination points 202; (ii) one or more content sources 103, (iii) one or more application distribution servers 204; (iv) one or more VOD servers 105, and (v) consumer premises equipment (CPE) 106. The distribution server(s) 204, VOD servers 105 and CPE(s) 106 are connected via a bearer (e.g., HFC) network 101. A simple architecture comprising one of each of the aforementioned components 202, 204, 105, 106 is shown in FIG. 2 for simplicity, although it will be recognized that comparable architectures with multiple origination points, distribution servers, VOD servers, and/or CPE devices (as well as different network topologies) may be utilized consistent with the invention. For example, the headend architecture of FIG. 2a (described in greater detail below) may be used.

Furthermore, as discussed in greater detail subsequently herein, the generalized network of FIG. 2 also includes one or more interfaces to other (e.g., external) networks that can be used for various functions.

The data/application origination point 202 comprises any medium that allows data and/or applications (such as a VOD-based application, gaming application, or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 202 and enter the network system. These servers may generate the content locally, or alternatively act as a gateway or intermediary from a distant source.

The CPE 106 includes any equipment in the "customers' premises" (or other locations, whether local or remote to the servers 204, 105) that can be accessed by a distribution server 204 or VOD server 105. Exemplary embodiments of a "converged" CPE (i.e., CD) of the invention are also described subsequently herein.

Figure 2A:
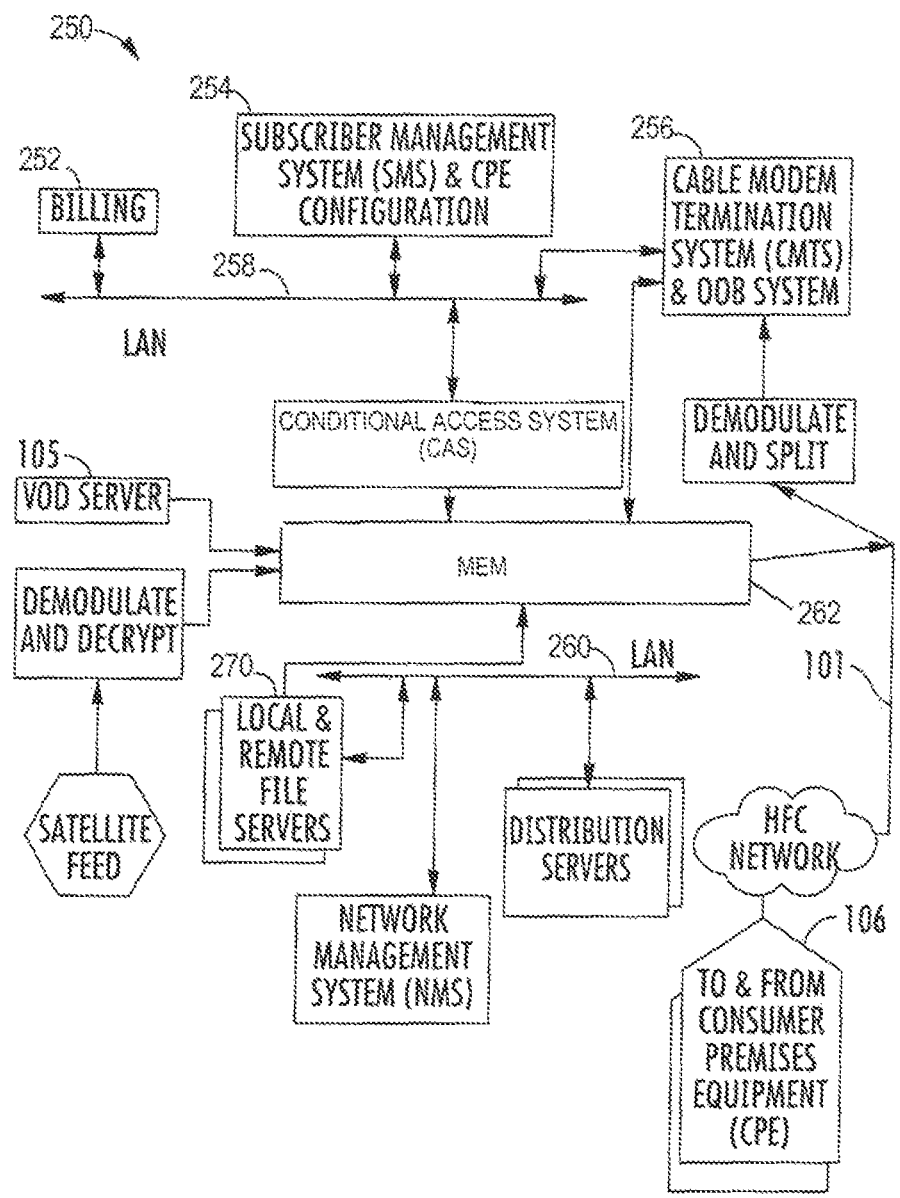
FIG. 2a is a functional block diagram illustrating one exemplary HFC cable network head-end configuration useful with the present invention.

Referring now to FIG. 2a, one exemplary embodiment of headend architecture useful with the present invention is described. As shown in FIG. 2a, the headend architecture 250 comprises typical headend components and services including billing module 252, subscriber management system (SMS) and CPE configuration management module 254, cable-modem termination system (CMTS) and OOB system 256, as well as LAN(s) 258, 260 placing the various components in data communication with one another. It will be appreciated that while a bar or bus LAN topology is illustrated, any number of other arrangements as previously referenced (e.g., ring, star, etc.) may be used consistent with the invention. It will also be appreciated that the headend configuration depicted in FIG. 2a is high-level, conceptual architecture and that each MSO may have multiple headends deployed using custom architectures.

The architecture 250 of FIG. 2a further includes a multiplexer/encrypter/modulator (MEM) 262 coupled to the HFC network 101 adapted to "condition" content for transmission over the network. The distribution servers 204 are coupled to the LAN 260, which provides access to the MEM 262 and network 101 via one or more file servers 270. The VOD servers 105 are coupled to the LAN 260 as well, although other architectures may be employed (such as for example where the VOD servers are associated with a core switching device such as an 802.3z Gigabit Ethernet device). As previously described, information is carried across multiple channels. Thus, the headend must be adapted to acquire the information for the carried channels from various sources. Typically, the channels being delivered from the headend 250 to the CPE 106 ("downstream") are multiplexed together in the headend and sent to neighborhood hubs (FIG. 2b) via a variety of interposed network components.

It will also be recognized, however, that the multiplexing operation(s) need not necessarily occur at the headend 250 (e.g., in the aforementioned MEM 262). For example, in one variant, at least a portion of the multiplexing is conducted at a BSA switching node or hub (see discussion of FIG. 2c provided subsequently herein). As yet another alternative, a multi-location or multi-stage approach can be used, such as that described in U.S. patent application Ser. No. 11/048,334, filed Feb. 1, 2005 and entitled "Apparatus and Methods for Multi-Stage Multiplexing in a Network" incorporated herein by reference in its entirety, which discloses inter alia improved multiplexing apparatus and methods that allow such systems to dynamically compensate for content (e.g., advertisements, promotions, or other programs) that is inserted at a downstream network node such as a local hub, as well as "feed-back" and "feed-forward" mechanisms for transferring information between multiplexing stages.

Content (e.g., audio, video, data, applications, etc.) is provided in each downstream (in-band) channel associated with the relevant service group. To communicate with the headend or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 2B:
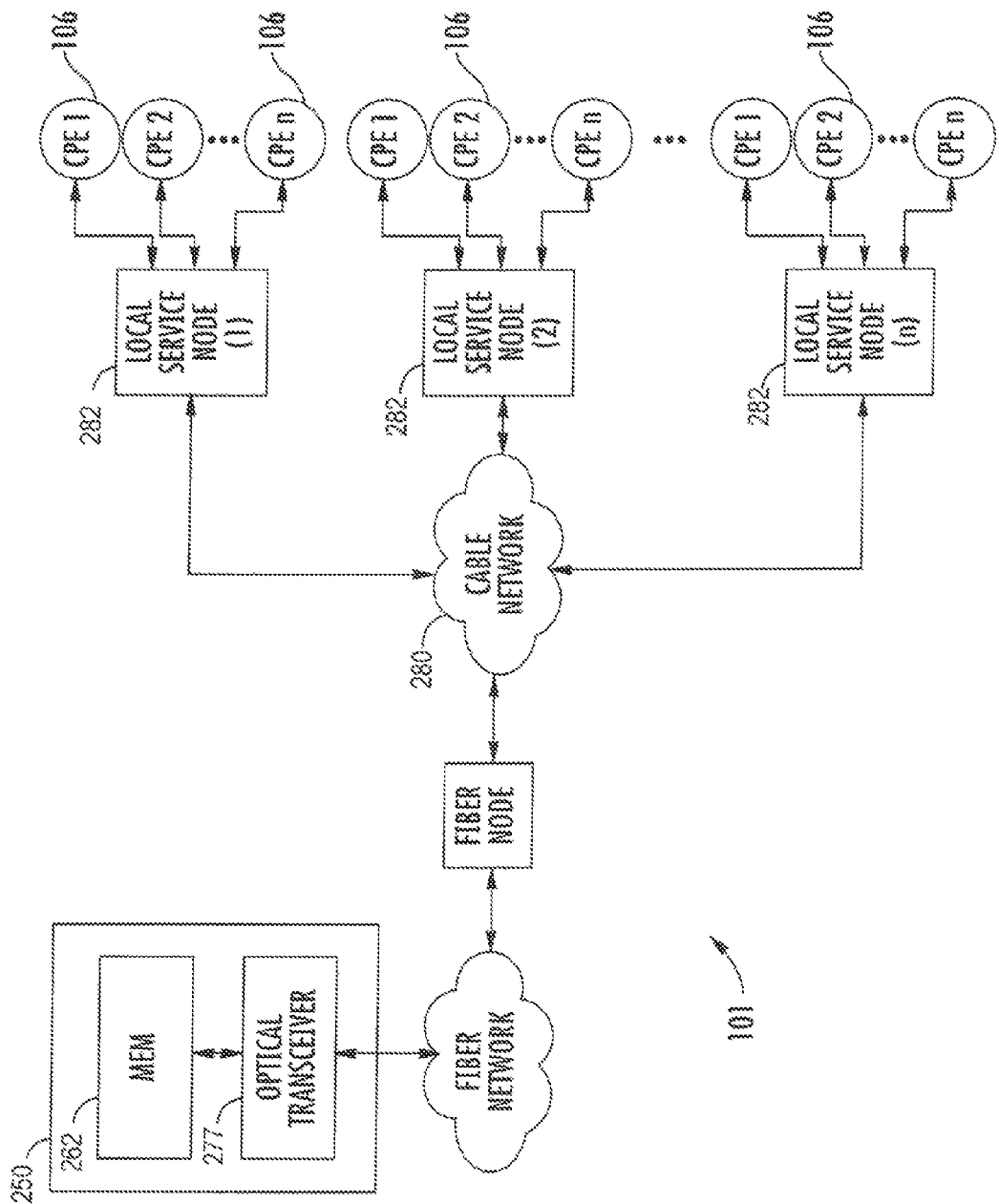
FIG. 2b is a functional block diagram illustrating one exemplary local service node configuration useful with the present invention.
Figure 2C:
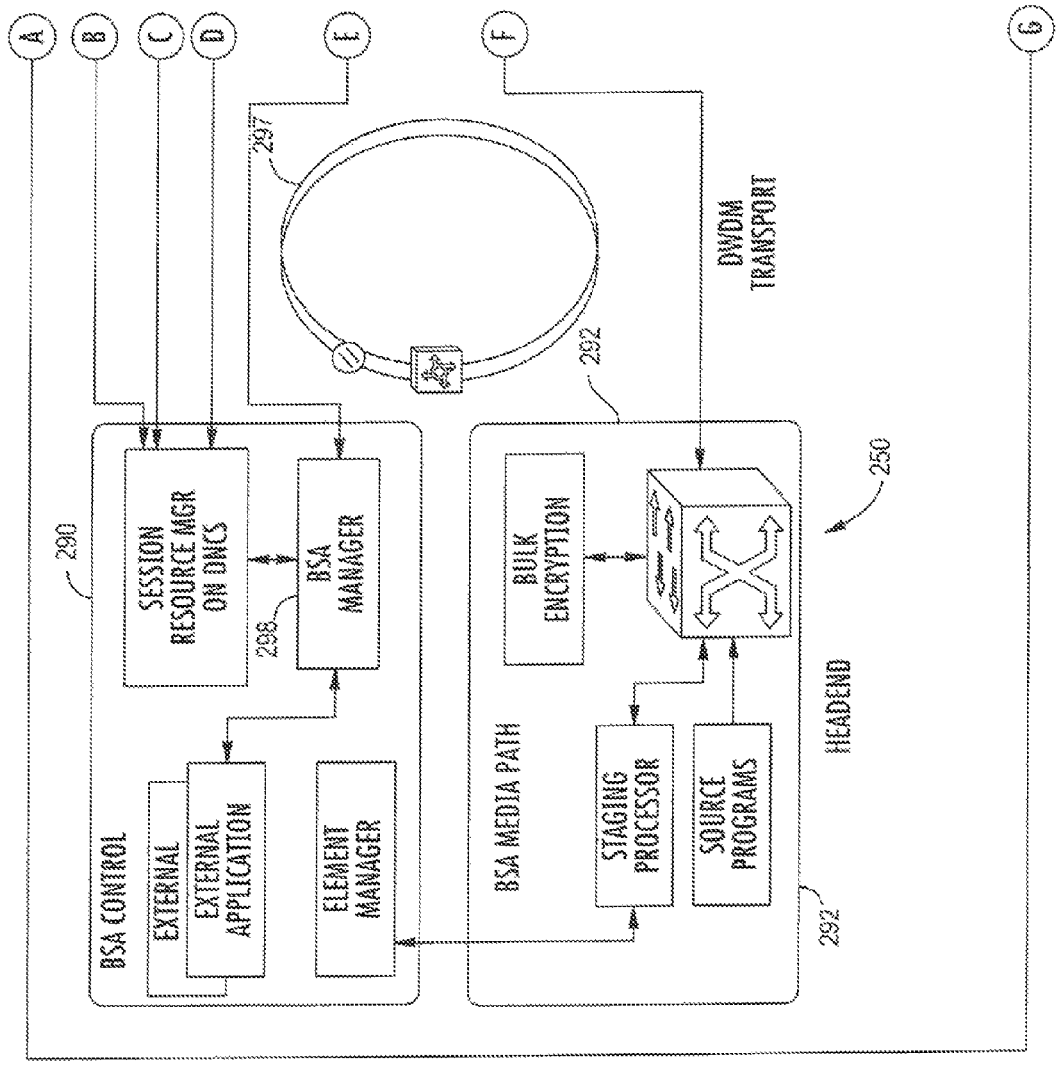
FIG. 2c is a functional block diagram illustrating one exemplary broadcast switched architecture (BSA) network useful with the present invention.
Figure 2C:
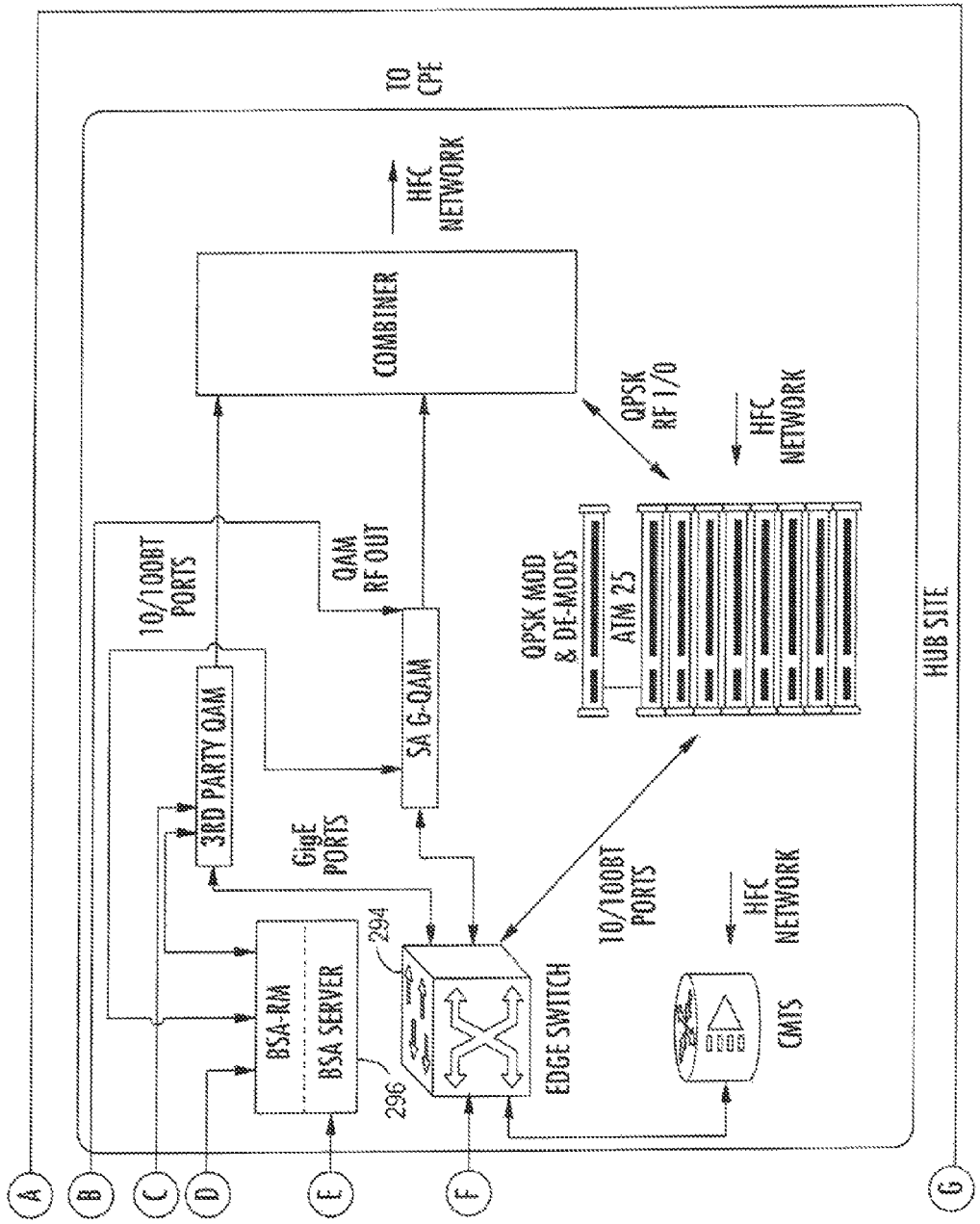

As shown in FIG. 2b, the network 101 of FIGS. 2 and 2a comprises a fiber/coax arrangement wherein the output of the MEM 262 of FIG. 2a is transferred to the optical domain (such as via an optical transceiver 277 at the headend or further downstream). The optical domain signals are then distributed to a fiber node 178, which further distributes the signals over a distribution network 280 to a plurality of local servicing nodes 282. This provides an effective 1:N expansion of the network at the local service end.

"Switched" Networks—

FIG. 2c illustrates an exemplary "switched" network architecture also useful with the improved nPVR apparatus and methods of the present invention; i.e., to deliver content via a broadcast. While a so-called "broadcast switched architecture" or BSA network is illustrated in this exemplary embodiment it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 2c shows the implementation details of one exemplary embodiment of this broadcast switched network architecture. Specifically, the headend 250 contains switched broadcast control and media path functions 290, 292; these element cooperating to control and feed, respectively, downstream or edge switching devices 294 at the hub site which are used to selectively switch broadcast streams to various service groups. A BSA server 296 is also typically disposed at the hub site, and implements functions related to switching and bandwidth conservation (in conjunction with a management entity 298 disposed at the headend). An optical transport ring 297 is utilized to distribute the dense wave-division multiplexed (DWDM) optical signals to each hub in an efficient fashion.

Co-owned U.S. patent application Ser. No. 09/956,688 filed Sep. 20, 2001, issued as U.S. Pat. No. 8,713,623 on Apr. 29, 2014, and entitled "Technique For Effectively Providing Program Material In A Cable Television System", incorporated herein by reference in its entirety, describes one exemplary broadcast switched digital architecture useful with the present invention, although it will be recognized by those of ordinary skill that other approaches and architectures may be substituted.

In one embodiment, the aforementioned broadcast switched digital architecture may be used in conjunction with the nPVR mechanisms discussed herein to provide a group or unicast streams to subscribers along with targeted advertisements.

In addition to broadcast or on-demand content (e.g., video programming), the systems of FIGS. 2-2b can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable or other modem.

The IP packets associated with Internet services are received by an edge switch (not shown), and forwarded to the cable modem termination system (CMTS). The CMTS examines the packets, and forwards packets intended for the local network to the edge switch. Other packets are discarded or routed to another component.

The edge switch forwards the packets receive from the CMTS to the QAM modulator, which transmits the packets on one or more physical (QAM-modulated RF) channels to the CPEs (or CD). The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

nPVR System Utilizing VOD Servers—

Figure 3A:
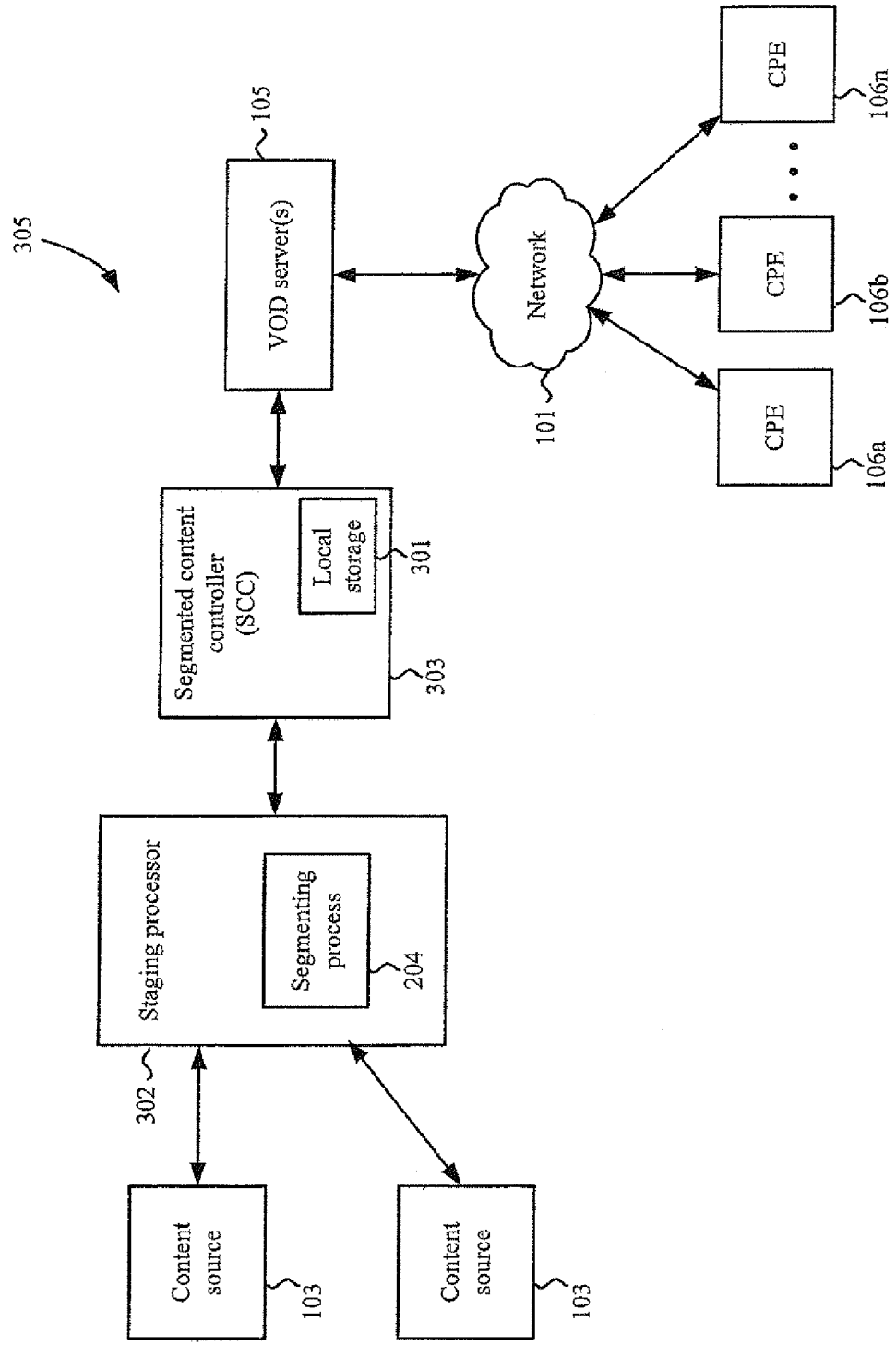
FIG. 3a is a functional block diagram illustrating an exemplary network configuration for storing and retrieving content in an nPVR model according to one embodiment of the present invention.

Referring now to FIG. 3a, one exemplary embodiment of an improved system 305 for storing and retrieving nPVR content is illustrated. It is noted that the apparatus, systems and methods described below are useful in providing storage and access to user-initiated nPVR content, as well as in providing storage and access to MSO-initiated nPVR content. Storage and access of MSO-initiated nPVR content enables a user to access content simultaneous to the content's broadcast, and to start the program over from the beginning after it has begun without the user having previously recorded the content (e.g., "start-over" functionality).

As shown, the system of FIG. 3a comprises at least one content source 103 providing content to the MSO. The content is presented to various network entities. Specifically, at least one mechanism is established for providing content directly to the user in accordance with a schedule (not shown); such mechanism is well known in the art and thus will not be discussed in further detail herein. Content which is tagged, either by a user-initiated or an MSO-initiated nPVR request, is provided to one or more staging processors 302 simultaneous to its broadcast.

Figure 1B:
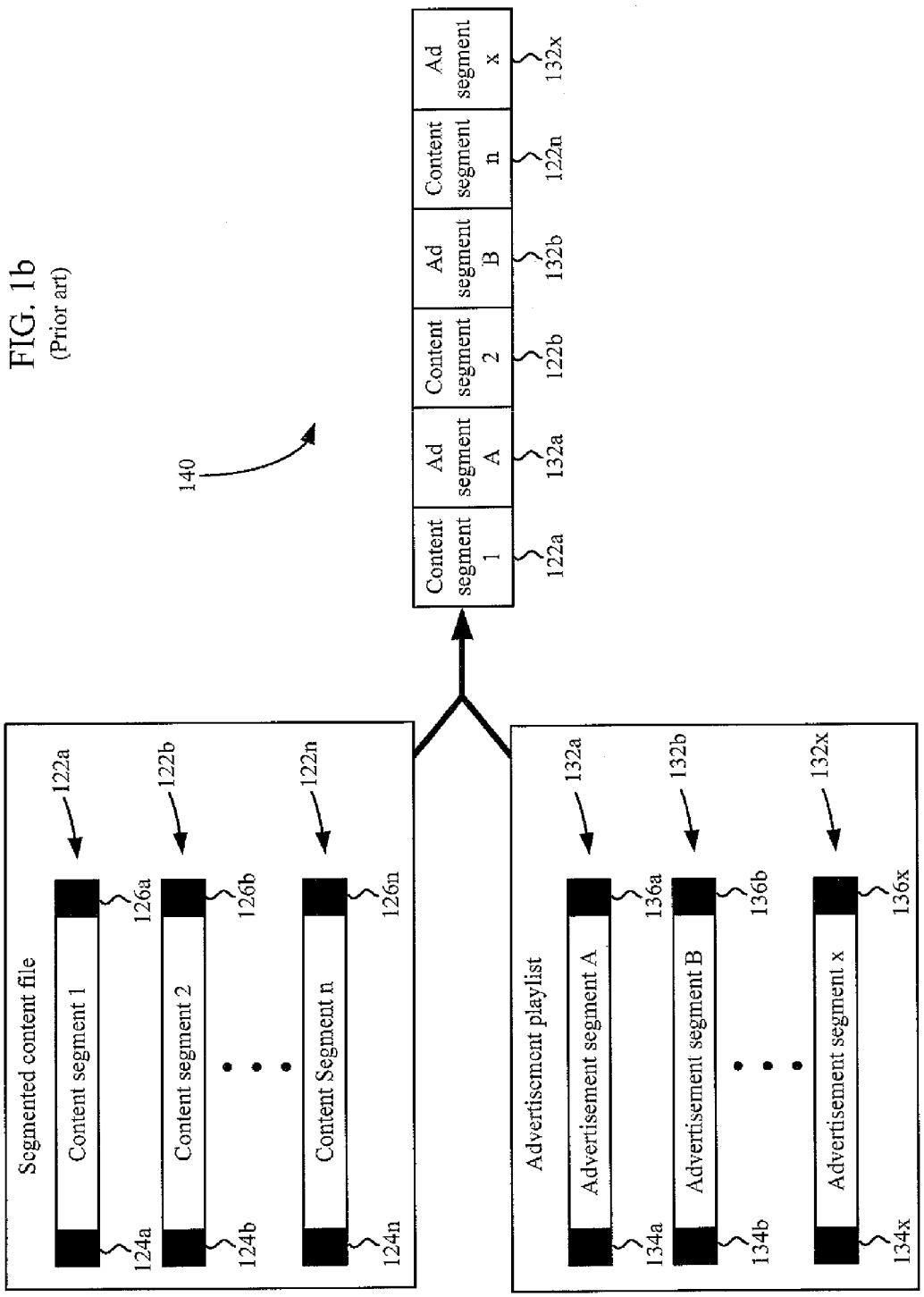
FIG. 1b is a functional block diagram illustrating an exemplary prior art content and advertisement stream assembly useful with the present invention.

As noted previously with respect to the prior art configuration of FIGS. 1a-1b, a staging processor is an entity adapted to condition content for display to a user. The staging processor 302 used in the present embodiment will be discussed in greater detail below, and generally prepares the content by utilizing various staging processes, which comprise software applications running on the digital processor associated with the staging processor 302. A segmenting process 104 is among the staging processes of the staging processor 302 and generally functions to segment content at I-frames according to a schedule. It is appreciated that the segmenting process 104 may comprise one or more software applications run on the staging processor 302, or on a separate headend or non-headend entity, or on the digital processor of any of the aforementioned headend entities.

Once the content has been appropriately spliced, the segmenting process 104 or the staging processor 302, if segmenting occurs thereon, transmits the segmented content to a segmented content controller (SCC) 303. The SCC 303 will be discussed in greater detail below, and generally is adapted to store, process, and assemble the segmented content. It is noted that in the present embodiment, the SCC 303 comprises a scalable Flash-based or RAM-based server entity.

As indicated, SCC 303 is adapted to store the segmented content received. Specifically, the content is stored to a local storage entity 301. The local storage entity 301 in this embodiment comprises a commodity-based local disk storage of the type well known in the field, although other storage media may be used. Storage of content to the local storage entity 301 greatly reduces the amount of content directed to the VOD servers (or other servers), as will be discussed below. It is appreciated that in one embodiment, the local storage entity 301 may comprise a separate entity in data communication with the SCC 303 and/or the staging processor 302, such as via an interposed bus, LAN, or wireless network.

It is also noted that the staging processor 302 and/or the segmenting process 104 may be of the type described in co-owned U.S. patent application Ser. No. 10/860,969 filed Jun. 2, 2004, issued as U.S. Pat. No. 8,392,952 on Mar. 5, 2013 and entitled "Programming content processing and management system and method", incorporated by reference herein in its entirety. Other approaches may be used with equal success as well.

When a request for content is made by a CPE 106 (such as via an upstream SSP or LSCP command), the request is sent to the SCC 303. The SCC 303 then assembles the content segments in a manner similar to that discussed above with respect to FIG. 1*a*.

Once the segments are assembled, the SCC 303 pushes the assembled content to the VOD server 105 (such as via a File Transfer Protocol or FTP "push" of the type well known in the networking arts) which, in turn, provides it to the CPE 106. Other technologies may be used for this purpose as well, including for example network attached storage such as CIFS (Common Internet File System), SAMBA (e.g., SAMBA 3.2), etc. It is also appreciated that in another embodiment, the VOD server 105 may be adapted to pull the assembled content from the SCC 303 upon CPE 106 request. Therefore, content is sent to the VOD server 105 only when requested, thereby minimizing the amount of unnecessary VOD server 105 storage. Further, the present invention advantageously incorporates dynamic secondary content (e.g., advertisement) insertion and other processing prior to delivery of the content stream to the VOD server 105, thus eliminating the requirement of the VOD server 105 to utilize a dynamic playlist, and jump around between segments of the content and advertisements.

It is noted that the illustration of FIG. 3*a* is merely exemplary in nature, and that alternate configurations having a greater number of the abovementioned components (and/or having one or more components with multiple functionality) discussed above may be utilized consistent with the present invention.

Figure 3B:
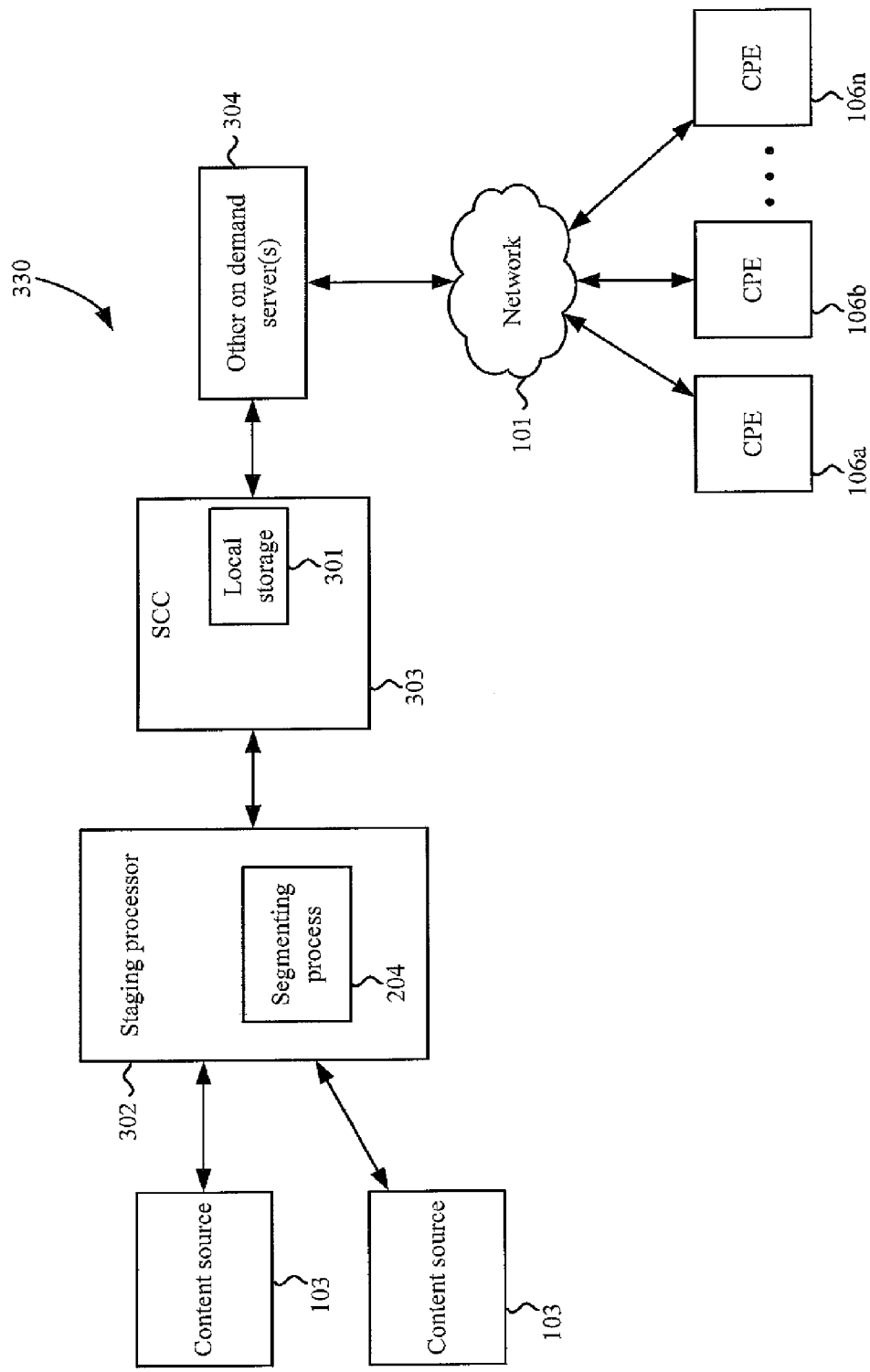
FIG. 3b is a functional block diagram illustrating another exemplary network configuration for storing and retrieving content in an nPVR model useful with the present invention.

In an alternative embodiment illustrated in FIG. 3*b*, the SCC 303 is adapted to send processed and segmented content to an alternative on-demand server 304. The alternative on-demand server 304 may comprise a flash-based on-demand (FOD) server. In the present context, the FOD server comprises an on-demand server similar to the VOD server 105 discussed above—however, the FOD server stores content in flash memory (rather than SCSI disks of the type described above), and uses hardware-assisted streaming. As is well known, flash memory (e.g., NAND flash) is extremely efficient at data storage, and provides such capability at a comparatively low cost relative to SCSI hard drive or other such approaches. Such devices also provide a very high level of streaming capability, and hence produce a very low cost-per-bit as compared to prior art (e.g., SCSI) drives. In one embodiment, the FOD server comprises an Orbit 2× Streaming Server device manufactured by Edgeware of Stockholm, Sweden. Alternatively, the server may comprise any off-the-shelf server such as those manufactured by HP, IBM, etc.

The exemplary FOD server may also utilize content propagation techniques to ensure that popular (i.e., frequently requested) content is always immediately available, and that less popular content is also available relatively quickly (but with greater latency). One technique for ensuring the above functionality is to utilize a content library coupled with placement of the "popular" content at one or more edge servers; less popular content is disposed at one or more remote storage sites. When a request is made for the popular content, it will be accessed from the edge servers immediately. If a request for content that is not in the local memory (edge server) is made, the FOD server will start delivery of a copy of the content from the storage (remote) server, such as via FTP (file transfer protocol) over a TCP/IP (Internet or LAN) channel, or some other protocol/channel of sufficient bandwidth. Since the popularity changes, the aforementioned edge storage must be continuously updated, using e.g., a dynamic distribution method wherein content elements are "swapped out" for others as the popularity of each varies over time.

Alternatively, the on-demand server of the embodiment of FIG. 3*b* may comprise a RAM-based on-demand (ROD) server, or DRAM-based on-demand (DROD) server. The ROD server comprises an on-demand server which stores content in RAM (random access memory); similarly, a DROD server is an on-demand server which stores content in a dynamic RAM (DRAM) memory. In one embodiment, the exemplary ROD server or DROD server comprises a Motorola B-1 Video Server with an optional SeaChange Axiom Core 4.0 software suite, although other devices and/or software may be used with equal success.

Exemplary methods by which content is streamed to a user in the exemplary improved nPVR systems of FIGS. 3*a* and 3*b* will be described in detail below.

nPVR System Bypassing VOD Servers—

Figure 4:
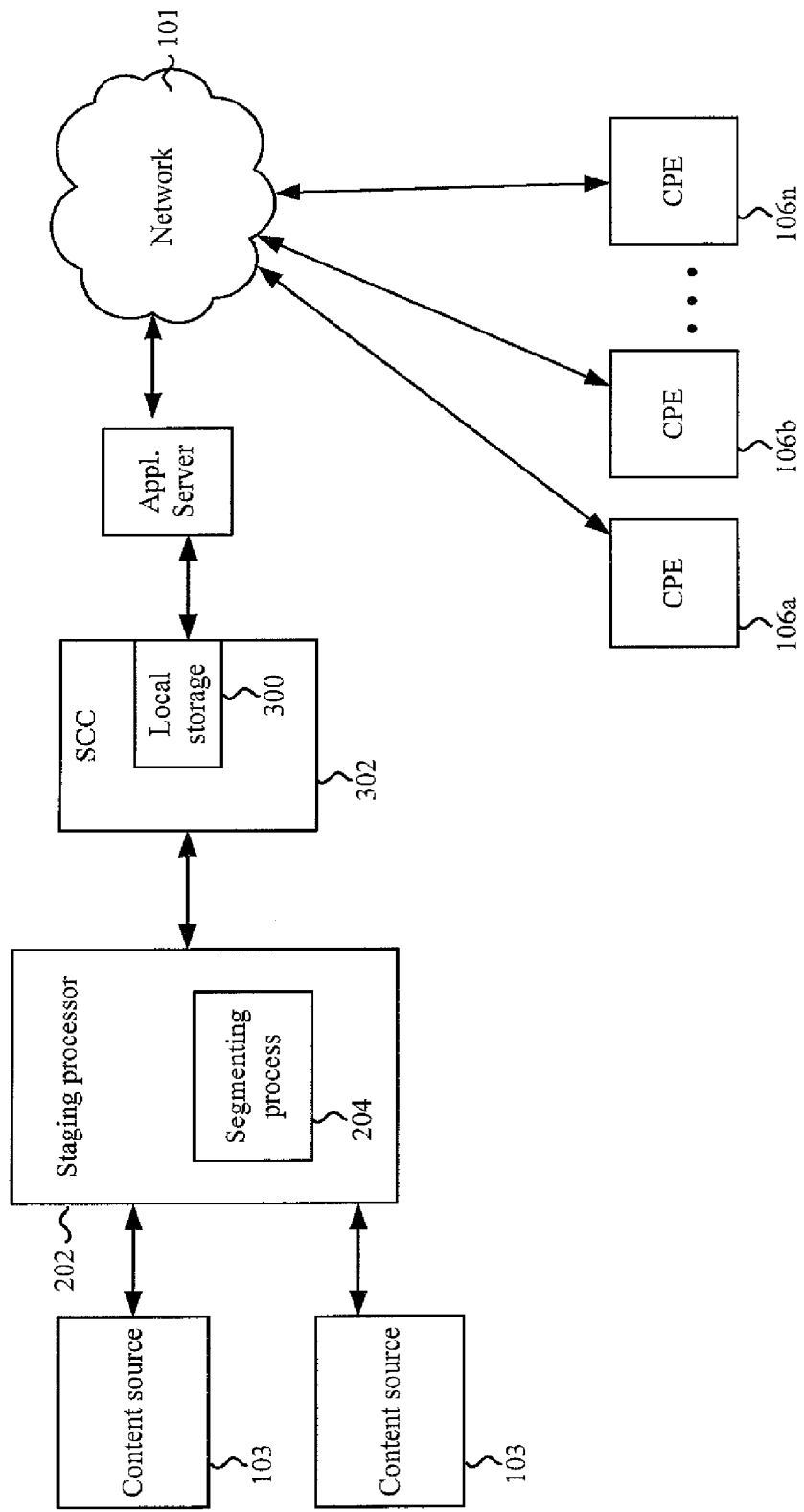
FIG. 4 is a functional block diagram illustrating yet another exemplary network configuration for storing and retrieving content in an nPVR model useful with the present invention.

Referring now to FIG. 4, another exemplary apparatus 400 for storing and retrieving content in an nPVR model is illustrated. As with other embodiments, the apparatus of FIG. 4 may be utilized in order to enable the various forms of nPVR functionality discussed above (e.g., user-initiated and MSO-initiated nPVR).

As is illustrated, the embodiment of FIG. 4 utilizes many of the aforementioned components and software processes discussed above, including one or more content sources 103, a staging processor 302 (having at least a segmenting function 104), and an SCC 303. The staging processor 302 and segmenting function 104 in one embodiment are of the type described in previously referenced co-owned and co-pending U.S. patent application Ser. No. 10/860,969.

Further, it is noted that alternative configurations having more than one of the given components and/or having components which perform more than one of the abovementioned functionalities may also be used in accordance with the invention.

In the embodiment of FIG. 4, content from one or more content sources 103 is received and routed to a staging processor 302. The staging processor 302 prepares the content via one or more staging processes or applications associated therewith. A segmenting process 104 is among the staging applications, and functions to segment the content at appropriate I-frames according to a schedule. The staging processor 302 and segmenting process 104 will be discussed in greater detail below. The segmented content is then transmitted to the SCC 303 for storage and processing.

The apparatus 400 of the embodiment of FIG. 4 bypasses the VOD server 105 or other on-demand servers 304 utilized in the embodiments of FIGS. 3a-3b. In other words, after the content is segmented and processed, the content is stored at the SCC 303, and is not passed to a VOD server 105 or other on-demand server 304. Rather, according to the embodiment of FIG. 4, the SCC 303 is further adapted to, upon user request, assemble and stream requested content to one or more application distribution servers 204 in the network 101. Thus, it is appreciated that in this embodiment, the SCC 303 comprises a scalable FLASH-based or RAM-based server entity adapted to both store and stream content. The application distribution servers 104 then deliver the content to the requesting user's CPE 106. In one embodiment, the application distribution server 104 may be of the type described in co-owned, co-pending U.S. patent application Ser. No. 10/263,015, entitled "Program guide and reservation system for network based digital information and entertainment storage and delivery system" and filed Oct. 2, 2002, which issued as U.S. Pat. No. 7,908,826 on Mar. 15, 2011 and is incorporated herein by reference in its entirety.

Methodology—

Figure 5:
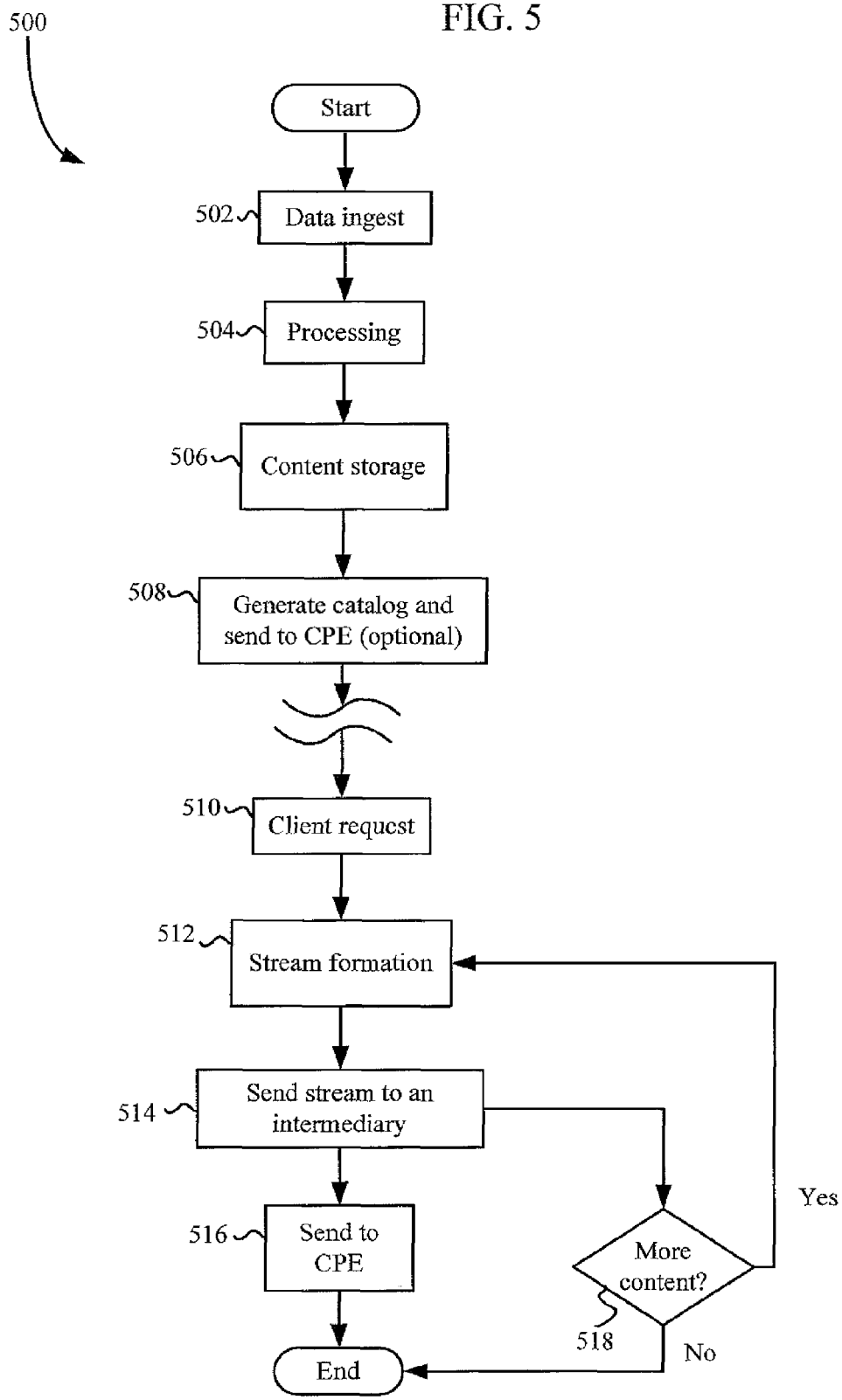
FIG. 5 is a logical flow diagram illustrating one embodiment of the method of providing nPVR capabilities according to the present invention.

Referring now to FIG. 5, one exemplary embodiment of the methodology 500 of providing nPVR capabilities for both user-initiated and MSO-initiated nPVR is described. It will be recognized that the steps shown in the embodiment of FIG. 5 are high-level logical steps applicable to any of the aforementioned nPVR architectures (e.g., FIGS. 3a, 3b, and 4), and are not intended to require or imply any specific process flow that may occur within particular implementations of the method. In practical embodiments, some of these steps (or sub-steps within each step) may be implemented in parallel, on different hardware platforms or software environments, performed iteratively, and so forth.

In the first step 502 of the method 500, data in the form of, e.g., one or more data files or structures is brought onto or "ingested" a head-end entity, such as by executing the appropriate communication protocol between the source of data and a head-end entity. The headend entity may comprise, inter alia, a staging processor 302 as discussed above. Alternatively, other headend entities may be utilized for initial storage of content and/or data as it is ingested into the system. Such ingestion of data and the supporting protocols to accomplish this function are well known in the art, and accordingly not described further herein. As used herein, the terms "data files" and "data structures" refer generally to literally any organized form or assembly of binary or other data such as, without limitation, binary executable files, graphics or audio files (compressed or otherwise), encryption-related files, "zipped" files, video files (e.g., AVIs or MPEGs), etc.

Per step 504, the ingested data is then processed. Processing may occur on various entities including, inter alia, a staging processor 302. As will be discussed in greater detail below, the staging processor 302 may comprise one or more software applications working in concert to perform various processing steps. Among the processing steps occurring at step 504 is a segmenting process 104 which segments the content at I-frame boundaries. Other processing steps and/or the segmenting process 104 may occur at entities separate from the staging processor 302 as well.

Processing may include code changes or upgrades to increase performance. For example, all content may be recorded directly to a disk or other storage media and then a file having pointers to particular locations in the content may be created and stored therewith. The files point to a collection of blocks on disk storage which may assist in manipulation of the content thereon. In one example, boundaries may be manipulated, advertisements may be inserted (as will be discussed in detail below), and/or capture control of the content may be posted. Further, the content may be cataloged for future identification and processing; different segments of the content may then be accessed in real-time (such as by facial recognition, pattern recognition, etc.). Other processing of the content may include insertion of a custom code or descriptive data. The data may be descriptive of the content by recognizing one or more breaking points and mapping these i.e., by taking signal definitions and embedding them.

Processing may further include removing discontinuity between segments of the content in real time, i.e., as the content is acquired. For example, one or more algorithms may be used to identify and remove blocks or flickers or other damaged areas.

The processed content is then stored (step 506). Storage may occur on the local storage entity 300 of the SCC 303. Alternatively, it is appreciated that the storage entity 300 may comprise a separate entity than the SCC 303 which is in data communication with the SCC and the staging processor.

At step 508, a catalog entry is optionally created for the loaded data file(s). In the embodiments of FIGS. 3a, 3b, and 4, the catalog entry will be generated by the SCC 303. The catalog entry is then sent to the user's CPE 106. This action is performed so that user CPE 106 can be made aware of the availability of the data file(s). This can be accomplished via, e.g., a navigator application implemented on the CPE 106, or some other user interface (UI) mechanism including on-screen alerts, audible signals, periodic or regularly scheduled status functions, etc.

The user may then select among the presented catalog entries at step 510. Alternatively, the user may request content via other mechanisms (e.g., without having the catalog entries presented to the client). A client request (either selection from a listing of catalog entries or otherwise) then triggers the SCC 303 to form an assembled content stream from the previously segmented content (step 512).

The stream formation of step 512 above comprises processing the data file(s) or other structures into a format or protocol suitable for transmission over the cable network ("stream formation"). For example, the data maybe formatted according to the well-known MPEG (e.g., MPEG2) packet data format such that the resulting data packets are effectively indistinguishable to the network infrastructure from other (i.e., content) packets. In the exemplary embodiments presented above, stream formation occurs at the SCC 303. Secondary content (e.g., advertisement) insertion and transcoding or transrating may also occur at step 512; each of which will be discussed in detail below.

It will be appreciated that in various embodiments, the storage, cataloging and stream formation processes (steps 506, 508, 512 respectively) may be implemented concurrently, serially, or in another implementation-specific order as required.

At step 514, the assembled content stream is sent to an intermediary entity. In the embodiment of FIG. 4, a downstream data flow is established (typically involving allocation of server, network and client resources) thereby enabling the data stream to be sent from the SCC 303 to the CPE 106 (step 516) via, for example, a network 101 application server 104 (as the intermediary entity). Alternatively, in the embodiments of FIGS. 3a and 3b, the assembled data stream is first sent to an on-demand server (either VOD server 105 or other on-demand server 304) at step 514, and the on-demand server establishes a connection (session) to the CPE 106 and sends the data stream thereto (step 516).

As noted previously, in the instance where a user requests MSO-initiated nPVR content (e.g., content that has begun broadcast in real time when the user joins the program), the various content segments will lag behind the actual real time broadcast. Accordingly, as time progresses, additional content segments may be routed through the staging process 302 (including segmenting process 104) and SCC 303 after a first segment or segments have been assembled (step 512) and sent on to the user (step 516). Thus, at step 518, the system will determine whether more content segments are available, if so, the content streams are formed and sent through an intermediary to the CPE in a manner similar to that described above.

Depending on the configuration, a user may be able to utilize one or more "trick mode" functions when viewing nPVR content. In the real-time nPVR system, the use of the "rewind" trick mode will cause playback of assembled content from the VOD server 105 (or alternatively from the SCC 303) and, the use of the "fast forward" trick mode will cause the system to Jump to portions of the assembled content segments which have been sent to the VOD server 105. It is possible that a user, when using the "fast forward" trick mode may fast forward to a point in the content which has not been routed through the SCC 303 and/or VOD server 105, i.e., the user "catches up" to the regular broadcast. When this occurs, the user may be directed to the current broadcast of the requested program. Alternatively, when this occurs, the user may be returned to 1× play mode (i.e., no longer fast forward) at a position near live.

It is appreciated that the present system may incorporate an optional feedback mechanism, whereby the system will gain information regarding the data flow to the requesting CPE 106. Based on the feedback obtained, some characteristics of the stream (e.g. transmission rate, encoding, multiplexing parameters, etc.) may be modified, and/or retransmissions of the data may take place in order to overcome any transmission errors.

According to one exemplary protocol, the data transmission is conducted, and the software process at the head-end server (or other transmitting location) also monitors retransmission requests to evaluate their frequency, etc. in order to determine a transmission "efficiency". For example, if transmission of a given data file at Rate A results in requests that 50% of the transmitted packets be re-transmitted (50% efficiency), then the server software process may reduce the rate by a predetermined or dynamically determined amount, to Rate B (B<A), measure efficiency, and adjust again if needed. Similarly, where Rate A produces no errors (100% efficiency), the rate can be incrementally increased until efficiency begins to drop, or another criterion (such as maximum channel rate) is reached.

Staging Processor and Associated Applications—

Figure 6:
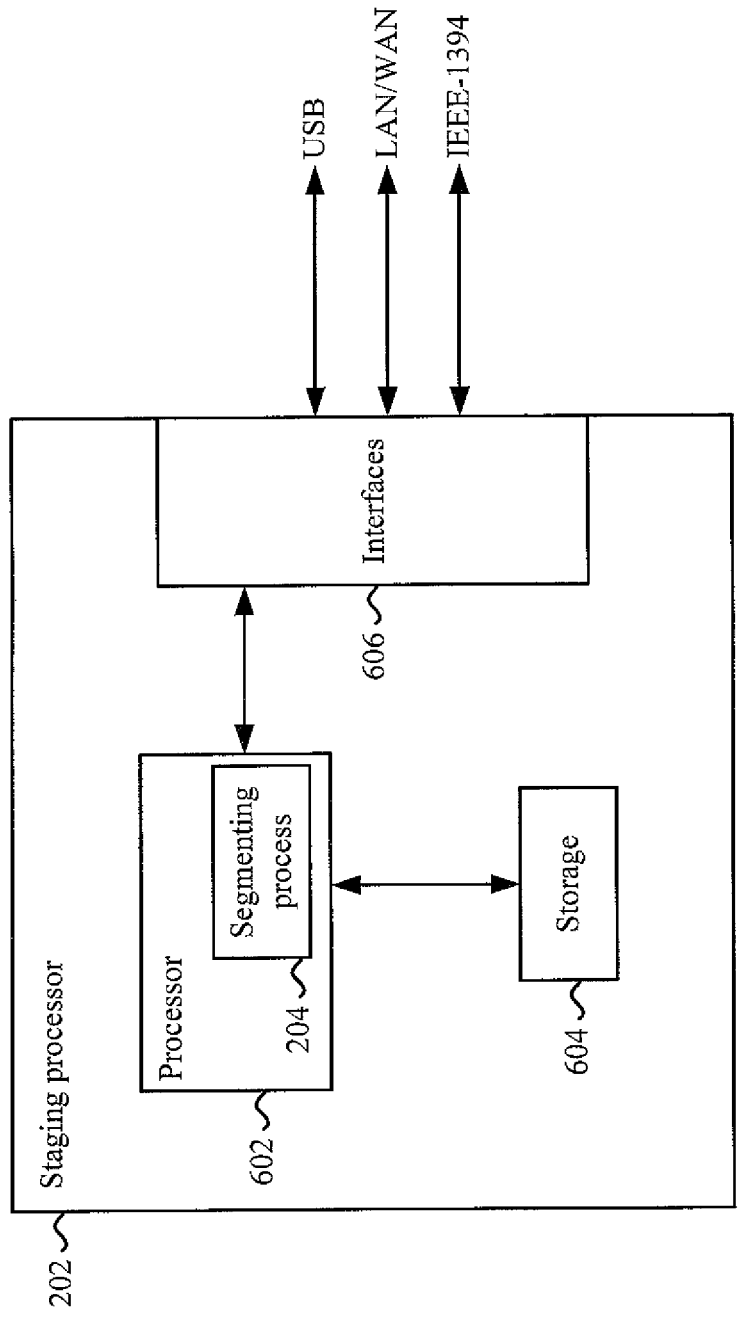
FIG. 6 is a functional block diagram illustrating an exemplary staging processor for use with the network configurations of FIGS. 3a, 3b and 4.

An exemplary staging processor 302 for use with the systems of FIGS. 3a, 3b and 4 is illustrated in the block diagram of FIG. 6. As shown, the staging processor 302 comprises storage device(s) 604, a digital processor(s) 602 and a plurality of interfaces 606 for connection to other devices in the network 101. The interfaces 606 also permit use of the staging processor with other network apparatus such as LANs, routers and other packet network devices, network management and provisioning systems, local PCs, etc.

The (mass) storage device 604 of the staging processor 302 is adapted to store a plurality of content received from one or more content sources as it is received. The storage device 604 may also be adapted to temporarily store the content between staging processes and/or after all staging processes have completed.

As illustrated, the staging processor 302 further comprises a digital processor 602. In one embodiment, the digital processor 602 is adapted to run (and optionally store in program memory) a segmenting process 104 thereon. The segmenting process 104 may be of the type described above, and will generally comprise one or more computer programs running on the digital processor 602 and adapted to perform various processing steps.

A segmenting process 104 may be among the processing steps performed by the staging processor 302. The segmenting process 104 generally functions to segment content at I-frames according to a schedule. It is appreciated that the segmenting process 104 may comprise one or more software applications run on the staging processor 302, or, alternatively, may be located elsewhere (such as on a separate headend or non-headend entity).

Other components which may be utilized within the staging processor 302 include amplifiers, board level electronic components, as well as media processors and other specialized SoC or ASIC devices. Support for various processing layers and protocols (e.g., TCP/IP, 802.3, DHCP, SNMP, H.323/RTP/RTCP, VoIP, SIP, LSCP, etc.) may also be provided as required. Where the content server is also acting in a local network capacity (e.g., as a VOD or application server), an appropriate application is also disposed to run on the server module to provide a functional interface for e.g., VOD session requests received from the LCD or other interposed entities. These additional components and functionalities are well known to those of ordinary skill in the cable and embedded system fields, and accordingly not described further herein.

It is also noted that, the staging processor 302 may take any number of physical forms, comprising for example one of a plurality of discrete modules or cards within a larger network headend or edge device of the type well known in the art. The staging processor 302 may also comprise firmware, either alone or in combination with other hardware/software components such as those previously described (e.g., disposed in the aforementioned edge device). The staging processor may even include its own RF front end (e.g., modulators, encryptors, etc.) or optical interface so as to interface directly with various portions of the HFC network 101 if desired. Numerous other configurations may be used. The staging processor 302 may also be integrated with other types of components (such as satellite transceivers, encoders/decoders, etc.) and form factors if desired.

It is also appreciated that the methods of the present invention may be practiced using any configuration or combination of hardware, firmware, or software, and may be disposed within one or any number of different physical or logical entities. For example, any required conditioning of the content before delivery (such as the inclusion of watermarking or other data, encryption, generation of encryption key pairs and/or challenges, and so forth) may take the form of one or more computer programs running on a single device disposed within the network, such as at a headend, node, or hub.

As yet another example, portions of the content distribution functionality may be rendered as a dedicated or application specific IC (ASIC) or DSP having code running thereon. For example, a security processor of the type well known in the art can be used to implement encryption algorithms on the delivered content, and/or to perform key pair generation and the like. Myriad different configurations for practicing the invention will be recognized by those of ordinary skill in the network arts provided the present disclosure.

The staging processor 302 operation can also be masked or controlled by a "business rules" engine" or other logical wrapper or layer as described subsequently herein.

The exemplary configuration of the staging processor 302 of the present invention comprises one or more applications adapted to enable the processor 202 to ingest content from one or more content sources 103. As used herein, the term "ingestion" refers generally to the process by which a data file or other data structure is transferred or loaded onto another entity, such as for example a staging processor 302. This ingestion may be accomplished by using appropriate wireline or wireless interfaces for the data (and any associated metadata or other data structures associated therewith).

The details or particular implementation of the syntax used for the ingestion process may be maintained consistent, or alternatively vary, from network to network. For example, in cable networks that implement the aforementioned ISA architecture, such data transfer is performed in accordance with the CableLabs® Asset Distribution Interface (ADI) Specification, Version 1.1, MD-SP-ADI1.1-I03-040107, dated Jan. 7, 2004, which is incorporated herein by reference in its entirety, although it will be appreciated that compliance with this specification is in no way a requirement in practicing the invention disclosed herein. For such ADI-compliant cable networks, the ingestion process relies on valid Asset Distribution Interface (ADI)-compliant files, and a predetermined sequence of steps as defined by the ISA specification. Such ADI files minimally contain the ADI.XML, ADI.DTD, and any MPEG transport files contained with the ADI.XML file.

The staging processor 202, as noted above, may comprise a segmenting process 104. The segmenting process 104 comprises one or more software applications adapted to enable cutting the content at I-frame boundaries. As noted above, the software architecture enabling segmenting may be of the type described in previously referenced co-owned, co-pending U.S. patent application Ser. No. 10/860,969.

Segmented Content Controller (SCC) and Associated Applications—

Figure 7:
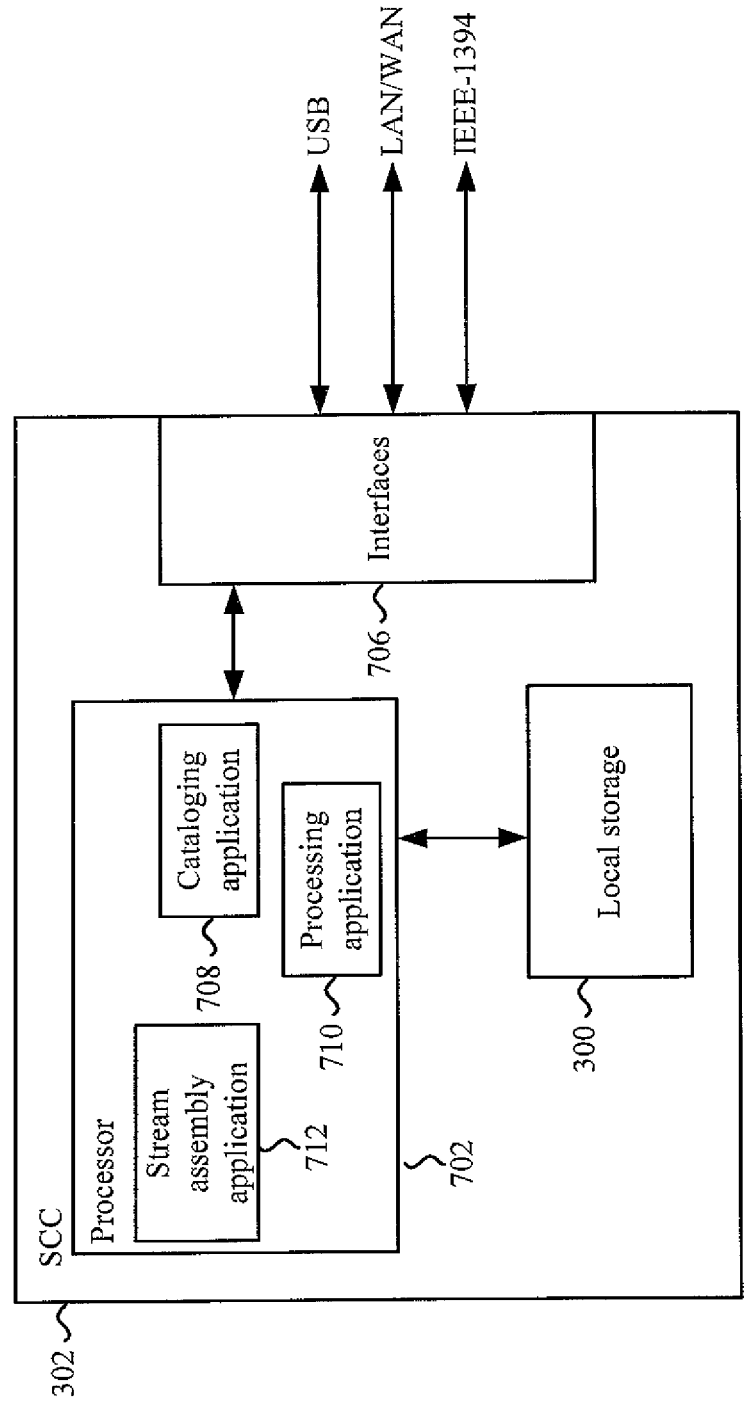
FIG. 7 is a functional block diagram illustrating an exemplary segmented content controller (SCC) for use with the network configurations of FIGS. 3a, 3b and 4.

The exemplary SCC 302 for use with the systems of FIGS. 3a, 3b and 4 is illustrated in FIG. 7. As shown, the SCC 302 comprises a digital processor(s) 702, a plurality of interfaces 706 for connection to other devices in the network 101 and a local storage entity 300.

Specifically, for the functionality necessary in the embodiment of FIGS. 3a, the SCC 302 interfaces 706 are adapted to enable data communication between the SCC 302 and the VOD server 105, in order to facilitate transmission of content therebetween. The SCC 302 in the embodiment of FIG. 3b, requires interfaces 706 which enable data communication between the SCC 302 with the other on-demand servers 304 (e.g., FOD, ROD, or DROD servers) or other designated servers as described elsewhere herein. The interfaces 706 also permit use of the SCC 302 with other network apparatus such as LANs, routers and other packet network devices, network management and provisioning systems, local PCs, etc.

The local storage entity 300 of the SCC 302 is a commodity-based local disk storage of the type well known in the field (e.g., SATA, PATA, SCSI, or other such device). A high-density FLASH memory (e.g., NAND Flash or the like) may also be used. The local storage entity 300 is adapted to store the segmented content as it is received from the segmenting process 104. As noted above, content will be received as a plurality of content segments. These content segments must be stored in a highly organized fashion (including optional cataloging) such that as new segments of a program are received, they are placed in appropriate locations and/or indexed with respect to the previously gathered portions of the same program.

It is appreciated that in one alternate embodiment, the "local" storage entity 300 may comprise a separate physical entity in data communication with the SCC 302 and/or the staging processor 302; e.g., located at a remote location from the SCC.

When a request for content is made by a CPE 106, the request is sent (directly or indirectly, depending on architecture) to the SCC 302. The SCC 302 then searches the organized content segments to identify the segments of the requested content which have been received thus far, and assemble them in a manner similar to that discussed above with respect to FIG. 3a. Specifically, the SCC 302 will identify the start and end points of the various content segments, and splice these together with start and end points of advertisement or other secondary content segments as required.

The assembly referred to above is implemented via one or more software applications running on the digital processor 702 of the SCC 302, as will be discussed in greater detail below.

After assembly of the segmented content is performed, the content is further prepared for streaming to a user. It is noted that in one embodiment, one or more VOD servers 105, or one or more FOD, ROD, or DROD servers 304 (per the embodiments of FIGS. 3a and 3b) may be utilized to facilitate streaming. In this instance, the SCC 302 merely pushes (or has pulled from it) the content to the VOD 105 or other server 304. Alternatively, content is streamed via the streaming capabilities of the SCC 302 itself (via a connection to a network 101 application server).

The SCC 302 is further adapted to, in one embodiment, generate a metadata file regarding each one of the content elements stored thereon. Creation of the metadata file on the local server (SCC 302) may be used in, inter alia, generating uniform asset distribution messages (such as those described in Cablelabs ADI 1.1 and/or 2.0 specifications), characterizing content as to it's subject matter, source, other attributes, etc., and/or for other business purposes disclosed subsequently herein.

It is noted that, when the system is utilized to reassemble content which was acquired in real time, the request for content must be received after the content distribution has begun. The SCC 302 is only able to send assembled content to the VOD server 105 as it is acquired. In other words, content from the SCC 302 will lag behind the actual broadcast of the content by some finite amount, and content segments can be assembled and transmitted to the VOD server 105 (or other distribution mechanism) as it is acquired.

In addition to those shown in FIG. 7, other components may be utilized within the SCC 302, including inter alia, amplifiers, board level electronic components, media processors, other specialized SoC or ASIC devices, and support for various processing layers and protocols (e.g., TCP/IP, 802.3, 802.16, 802.11, 802.1x, DHCP, SNMP, H.323/RTP/RTCP, VoIP, SIP, LSCP, XMPP, etc.) for e.g., allowing communications between various network and management entities. These additional components and functionalities are well known to those of ordinary skill in the cable and network system fields, and accordingly not described further herein.

The SCC 302 may take any number of physical forms, comprising for example one of a plurality of discrete modules or cards or disks within a larger network headend or edge device of the type well known in the art. Alternatively, the SCC 302 may comprise a single server utilizing a storage area network. Numerous other configurations may be used. Further, the methods of the present invention may be practiced using any configuration or combination of hardware, firmware, or software, and/or maybe disposed within one or any number of different physical or logical entities.

The exemplary SCC 302 of the embodiment of FIG. 7 of the present invention comprises one or more content stream assembly applications. Exemplary content streams are generated by cataloging and processing received content (which may include inter alia decoding, transcoding/transrating, re-encoding, and segmentation), and utilizing the resulting processed content segments along with advertisement or other such secondary content segments to create one or more "content-plus-advertisement" assembled streams.

A content cataloging application 708 may be incorporated into the exemplary SCC 302 of the embodiment of FIG. 7. As noted above, as content is made available to users in the nPVR model, one or more catalog entries for the ingested data file(s) are created. These catalog entries can be made generic or standardized in nature, or alternatively application-specific (e.g., with respect to the client application or CPE 106 as discussed below). Alerts or notice to the user can be accomplished via, e.g., a "navigator" application implemented on the CPE 106, another dedicated application, extant notification mechanisms such as those associated with the CPE middleware, or some other user interface (UI) mechanism including on-screen alerts, audible signals, periodic or regularly scheduled status functions, etc.

For example, the navigator application deployed in cable networks operated by the Assignee hereof uses an exemplary catalog structure (see FIGS. 7a-7d herein) to utilize data for the CPE 106. Accordingly, one embodiment of the present invention utilizes this same catalog structure for consistency, although it will be recognized that other structures may be used with equal success.

For existing on-demand (OD) services, three specific catalog structures are used (i.e., Group, OnDemand Menu3, and OnDemand Selection).

Figure 7A:
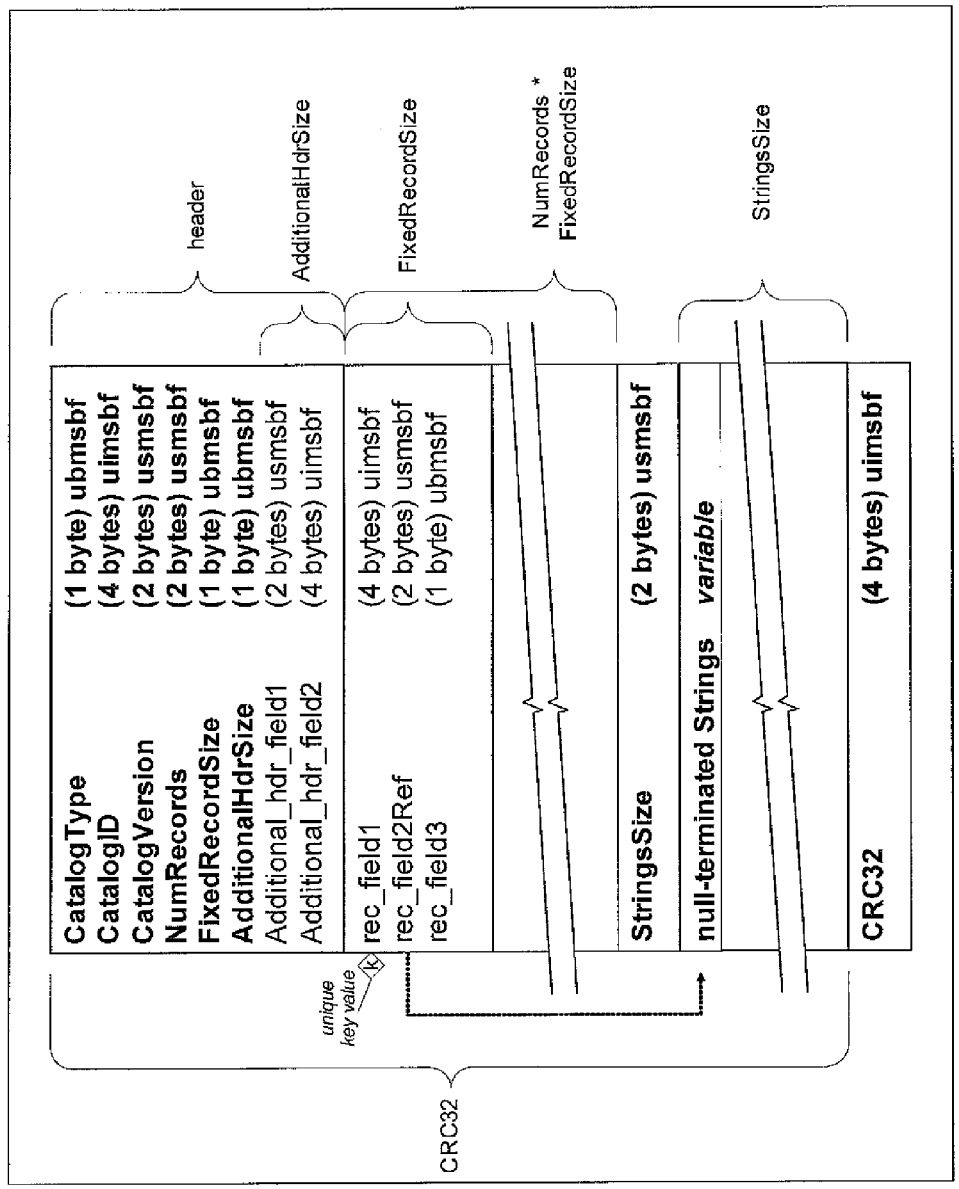
FIG. 7a illustrates exemplary basic structure of a catalog entry according to one embodiment of the present invention.

FIG. 7a illustrates a basic construct of one exemplary implementation of the catalog. All catalogs in this embodiment derive from this basic structure.

Figure 7B:
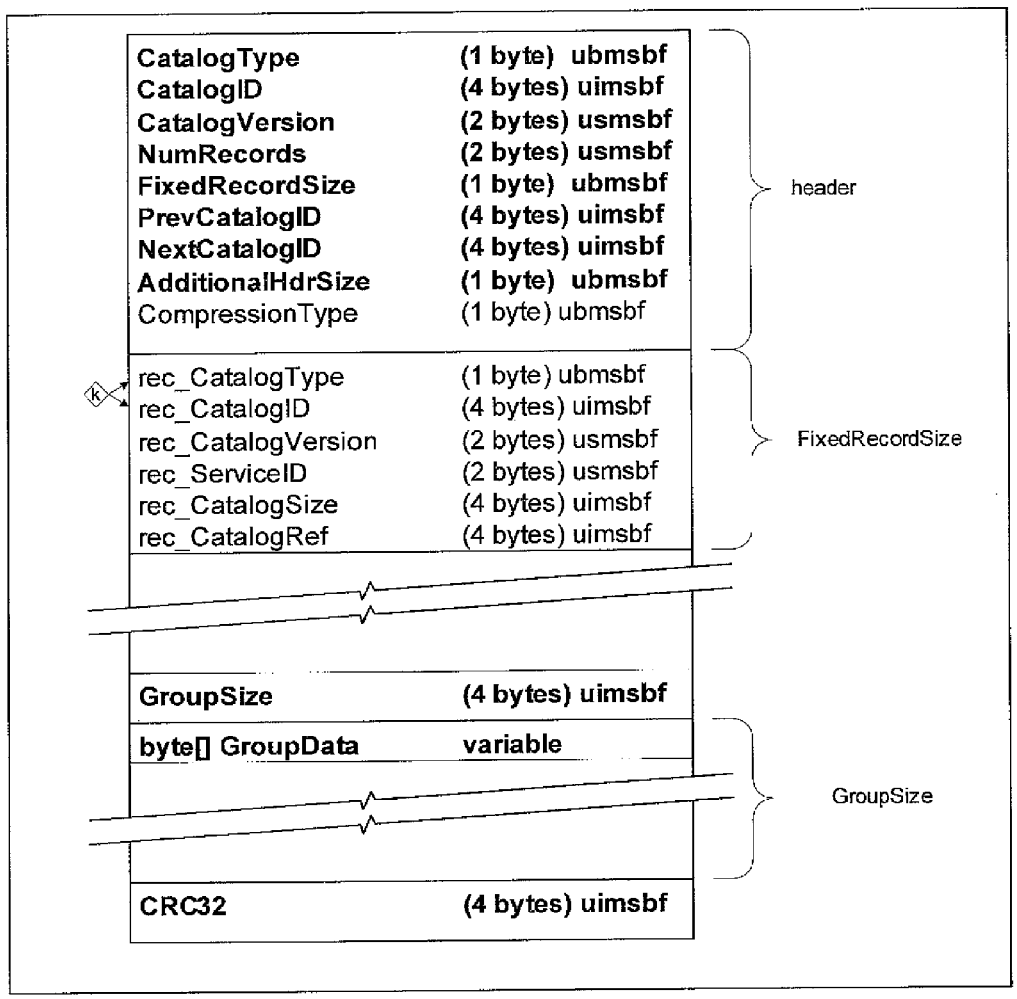
FIG. 7b illustrates exemplary structure of a group catalog entry according to one embodiment of the present invention.

FIG. 7b illustrates an exemplary Group catalog structure useful with the present invention.

Figure 7C:
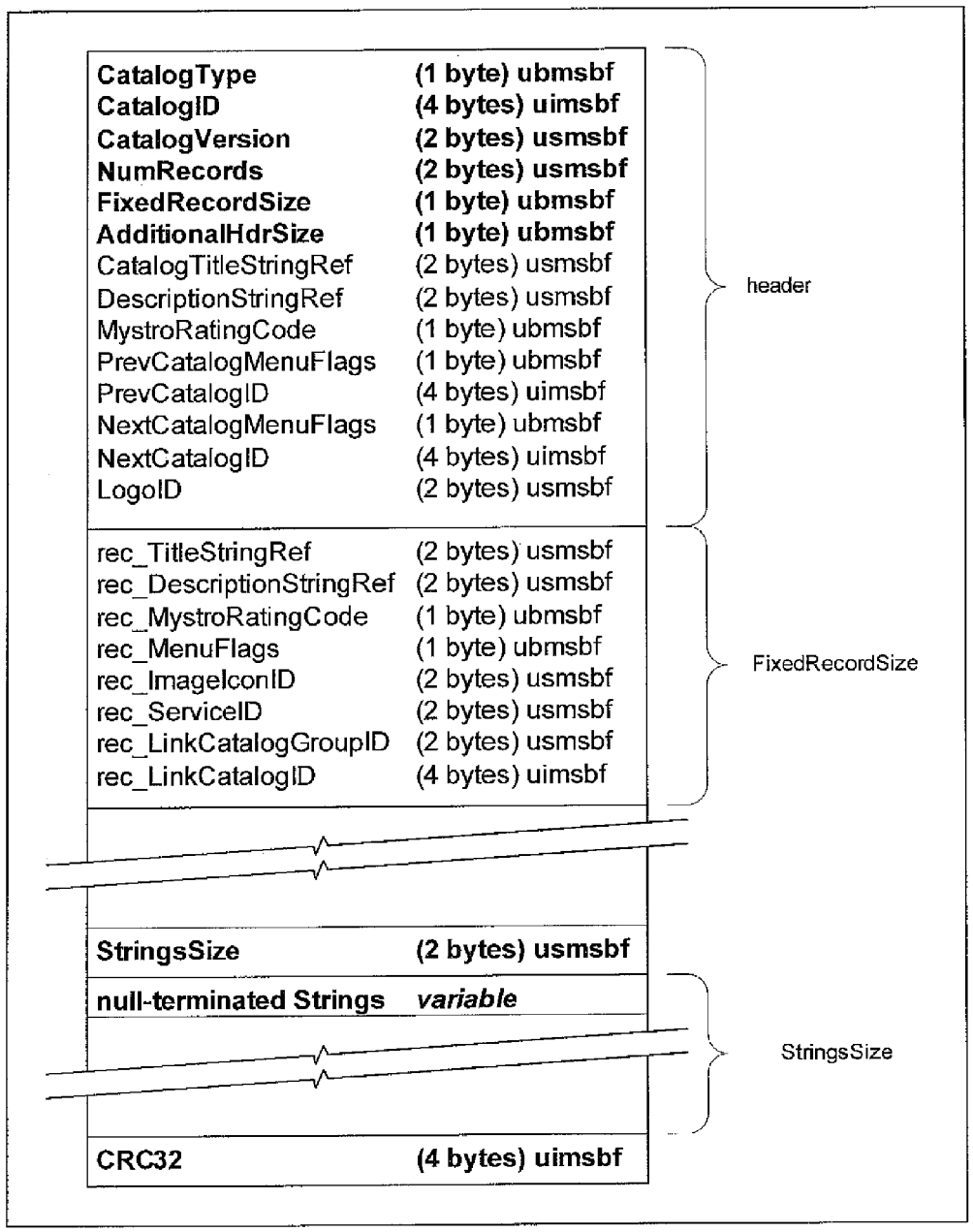
FIG. 7c illustrates exemplary structure of an on-demand menu catalog entry according to one embodiment of the present invention.

FIG. 7c illustrates an exemplary OnDemand Menu3 Catalog Structure useful with the invention.

Figure 7D:
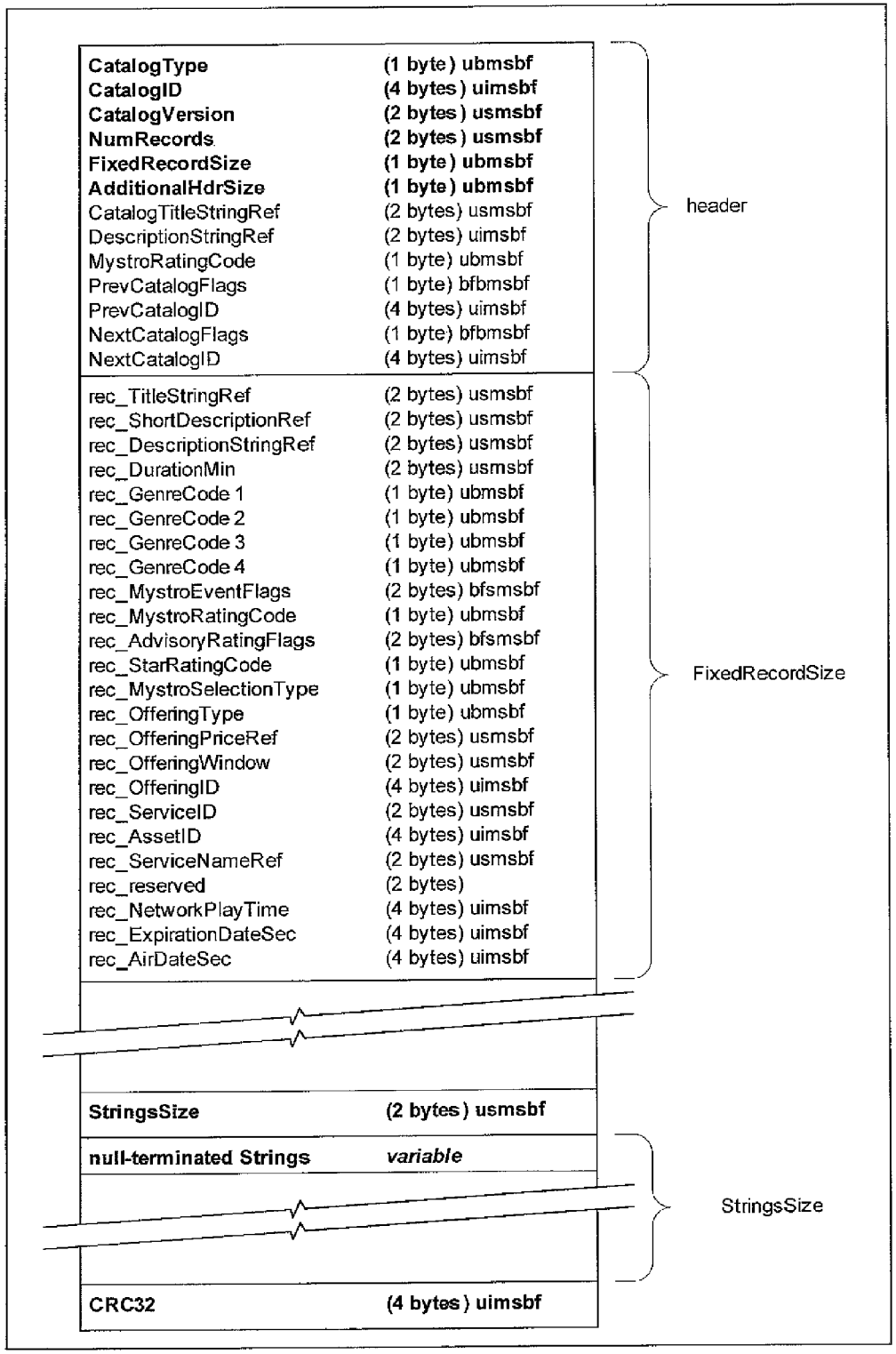
FIG. 7d illustrates exemplary structure of an on-demand selection catalog entry according to one embodiment of the present invention.

FIG. 7d illustrates an exemplary OnDemand Selection Catalog Structure useful with the invention.

Referring again to FIG. 7, the exemplary SCC 302 of the embodiments of FIGS. 3a, 3b and 4 may comprise one or more content processing 710 applications. In one exemplary embodiment, the one or more processing applications 710 are adapted to transcode or transrate the segmented content. As previously noted, the segmenting processes 104 utilized while running open GOPs often make imprecise cuts or create other issues (buffering or closed COPS), ultimately resulting in various artifacts in the delivered content stream. Accordingly, the transcoding applications of the instant embodiment clean up the artifacts and/or points of imprecise boundary cutting within the various content segments. Transcoding generally comprises direct digital-to-digital conversion from one codec (coder-decoder) to another. In one embodiment, transcoding is achieved by decoding a bitstream into YUV format using a compatible decoder, and then encoding the data using an encoder of a target standard. In another embodiment transcoding is achieved without its undergoing the complete decoding and encoding process. In yet another embodiment segments of the data near the splice points may be transcoded in order to make the playlist usage easier. In another embodiment the data may transcoded to other codecs if needed for lower bitrates or different set tops. These and other methods of transcoding are well known in the art and thus will not be discussed in greater detail herein.

The exemplary SCC 302 of the embodiments of FIGS. 3a, 3b and 4 may also comprise one or more stream assembly applications 712. The stream assembly applications 712 are adapted to cause the insertion of advertisements or other secondary content (e.g., promotions, short clips, notices or warnings, infomercials, etc.) into the segmented content to create seamless content-plus-advertisement assembled streams 240. In one embodiment, stream assembly is accomplished in a manner similar to that described above with respect to the VOD server 105 of FIG. 2a. Specifically, the application 712 will utilize data contained in the data file to locate the start and end points of the various primary content and secondary content segments. The application 712 then will, at the end point of a first segment (whether advertisement or content), direct the insertion of the start point of a segment of opposite type (either advertisement or content depending on what preceded it). This pattern continues until the last of the content segments and/or advertisement segments have been incorporated into the content-plus-advertisement assembled stream 240. Other techniques or orders may be used as well, such as where multiple advertisements and/or content segments are placed back-to-back, in other sequences, etc.

The SCC 302 of the embodiment of FIG. 4 may further be adapted to include one or more content streaming applications (not shown). The content streaming applications assist in the delivery of content streams to a CPE 106 via one or more application distribution servers 104.

In another aspect, the present invention permits the acquisition of a single network stream for multiple advertising zones. In one variant, the MSO or other network operator can mark the designated content in storage with pointers or other such mechanisms, and create a new file that has descriptors that point to e.g., the Content Chapter storage blocks provided from the supplying network; a pointer to the advertisement files for either the "linear" broadcast for the advertising zone, or a set of targeted advertisements, would be used to designate the desired advertisements for insertion. This functionality could be implemented using e.g., an SCTE 130 approach of the type well known in the video arts, although other approaches may be used with equal success.

The foregoing approach allows for, inter alia, reduced acquisition costs, as well as the ability to insert targeted or geographically-specific advertisements on a local basis.

Moreover, by making use of much cheaper content storage (e.g., the SATA or FLASH-based server devices previously described herein), as the MSO acquires "lookback" rights to content (i.e., the ability to rebroadcast or distribute previously aired content), a much larger store of network content can be acquired and placed within ready storage in a cost-efficient manner, thereby providing better service (and a larger catalog or library from which to choose) to their subscribers. For example, a "storage farm" could be established wherein a prescribed period of past offerings (e.g., the last calendar week for 100 different channels) could be efficiently and cost-effectively stored on a rolling basis.

Consumer Premises Equipment (CPE) and Associated Applications—

Figure 8:
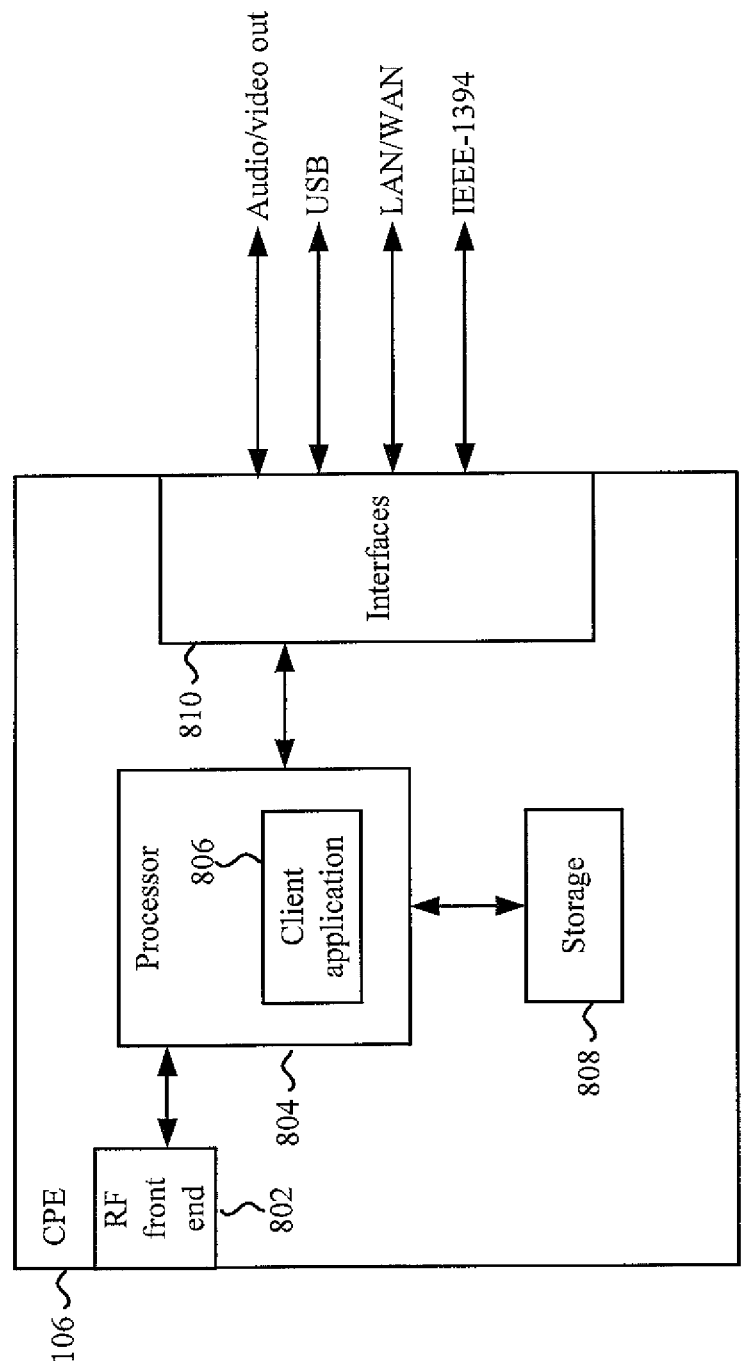
FIG. 8 is a functional block diagram illustrating one embodiment of a CPE for use with the network configurations given in FIGS. 3a, 3b, and 4.

FIG. 8 illustrates a typical CPE 106 configuration useful with the present invention. The CPE 106 may or may not include DVR/PVR functionality. Also, the CPE 106 may not be a physically separate or stand-alone piece of equipment but be integrated into another device, such as in the case of a cable-ready television set.

As shown in the simplified diagram of FIG. 8, the COPE 106 generally comprises an OpenCable-compliant embedded system (e.g., DSTB) having an RF front end 802 (including tuner and demodulator/decryptors) for interface with the HFC network 101 of FIGS. 2*a*-4, digital processor(s) 804, a mass storage device 808, and a plurality of interfaces 810 (e.g., video/audio interfaces, IEEE-1394 "FireWire", USB, serial/parallel ports, etc.) for interface with other end-user apparatus such as televisions, personal electronics, computers, WiFi or other network hubs/routers, etc.

Other components which may be utilized within the device (deleted from FIG. 8 for simplicity) include various processing layers (e.g., DOCSIS MAC or DAVIC OOB channel, MPEG, etc.) as well as media processors and other specialized SoC or ASIC devices. The CPE 106 may also comprise an integrated HD decoder, thereby relieving any connected monitors or other devices from the requirement of having such a decoder. These additional components and functionality are well known to those of ordinary skill in the cable and embedded system fields, and accordingly not described further herein.

The CPE 106 of FIG. 8 is also provided with an OCAP-compliant application and Java-based middleware which, inter alia, manages the operation of the device and applications running thereon. It will be recognized by those of ordinary skill that myriad different device and software architectures may be used consistent with the tuning and content request functions of the present invention, the device of FIG. 8 being merely exemplary. For example, different middlewares (e.g., MHP, ARIB, or ACAP) may be used in place of the OCAP middleware of the illustrated embodiment.

While the foregoing embodiments of the present invention are described primarily in terms of an on-demand infrastructure adapted to transmit content over a single physical channel (e.g., 256-QAM modulated carrier) at any given time, it will be recognized that this "physical channel" may actually comprise one or more carriers. For example, in one multi-carrier variant of the invention, the content is streamed over multiple physical carriers according to a multiplexing algorithm such as that described in co-owned and co-pending U.S. patent application Ser. No. 11/013,671 filed Dec. 15, 2004 and entitled "Method And Apparatus For Wideband Distribution Of Content", incorporated herein by reference in its entirety. Under this approach, the content can be multiplexed across a plurality of physical carriers, with the multiplexed signal being reassembled at the CPE 106 using a wideband tuner (or a plurality of related tuners). Information from the head-end as to the multiplexing scheme and channels used is provided to the CPE 106 in order to enable it to de-multiplex (and decode) the multiplexed transport stream. Hence, for the purposes of this embodiment, the aggregation of multiplexed channels acts like a single QAM.

In another embodiment (not shown), the CPE 106 may comprise a converged device (CD), such as that described in co-owned U.S. patent application Ser. No. 11/378,129 filed Mar. 16, 2006, issued as U.S. Pat. No. 8,347,341 on Jan. 1, 2013, and entitled "Methods and Apparatus for Centralized Content and Data Delivery", and incorporated herein by reference in its entirety. The exemplary CD comprises a remotely manageable premises device that, inter alia, acts as a centralized client networking platform providing gateway services such as network management as well as traditional content and high-speed data delivery functions. The device also acts as the shared internet (e.g., Internet) connection for all devices in the premises via a cable modem or other such interface, sharing personal and DVR content such as video, music and photos (and any associated metadata) throughout the premises, and providing both a wired and wireless network in the home. Telephony services utilizing e.g., embedded multimedia terminal adapter (eMTA) and/or Wi-Fi architectures may also be provided via the device; these services can make use of the network operator's indigenous VoIP or comparable telephony capability if desired, thereby providing an even more unified service environment. The converged premises device can also provide a trusted domain for content or data, as well as allowing a subscriber total mobility in the home by not limiting content or data to any one viewing/access location. For example, content or data may be accessed on any monitor in the premises, as well as on a PC or personal media device (PMD).

The exemplary CPE 106 of FIG. 8 further comprises an nPVR content or media application, which allows a user to manage his personal content as stored at the SCC 302 or associated network storage entity. Such management includes, but is not limited to, the ability to browse through content stored to see which are available for viewing, select content for local (premises) viewing, and configure various parameters associated with the remote access (e.g., user logon names, passwords, account parameters, billing, etc.). Such management functions may also include executing requests for beginning a broadcast program over during the programs original broadcast window (i.e., "start-over").

The aforementioned nPVR application may be a stand-alone application running on the CPE 106, or alternatively may have some or all of its functionality integrated or combined with other extant applications (or even the middleware of the CPE), such as the aforementioned "navigator application", EPG, "Watch TV" application, or the like. It may also comprise a client portion of a client-server or distributed application (DA), such as described below.

The nPVR content application or client portion is also responsive to a network-side application (e.g., server portion of the SCC 302) in order to receive and service client requests, and provide notification or display functions as previously described herein. The server portion at the SCC can also be configured in one variant to query the CPE 106 to check on the content titles stored on the CPE 106 (in instances where the CPE 106 is associated with a DVR, or a premises network having another mass storage device), and other data related thereto.

In one implementation, the client portion resident on the CPE 106 tracks and reports user activity related to personal content viewing to the relevant network server(s) for each CPE 106. This activity tracking is useful from a number of perspectives, including: (i) determining remote access to content that has been stored (at a DVR, if applicable) or viewed locally; (ii) in billing-related functions; and (iii) in determining when programs are added or deleted from the local storage (e.g., user's DVR, where applicable). This tracking can also be performed in a substantially anonymous fashion, such as through use of cryptographic hashes of TUNER ID, MAC, and similar variables as described in detail elsewhere herein. Such mechanisms allow for specific identification of the CPE 106 which has recorded or accessed content, without necessarily having to know the subscriber's identity. Various business models implementing the above-described tracking function will be discussed in detail below.

Furthermore, an application on the CPE 106 can be made to be responsive to the user's commands to control the "trick modes" of content viewed from the nPVR. In one embodiment, one or more trick modes may be made unresponsive such as during start-over of a program in its original broadcast window as discussed in previously incorporated co-owned U.S. patent application Ser. No. 10/913,064.

Figure 8A:
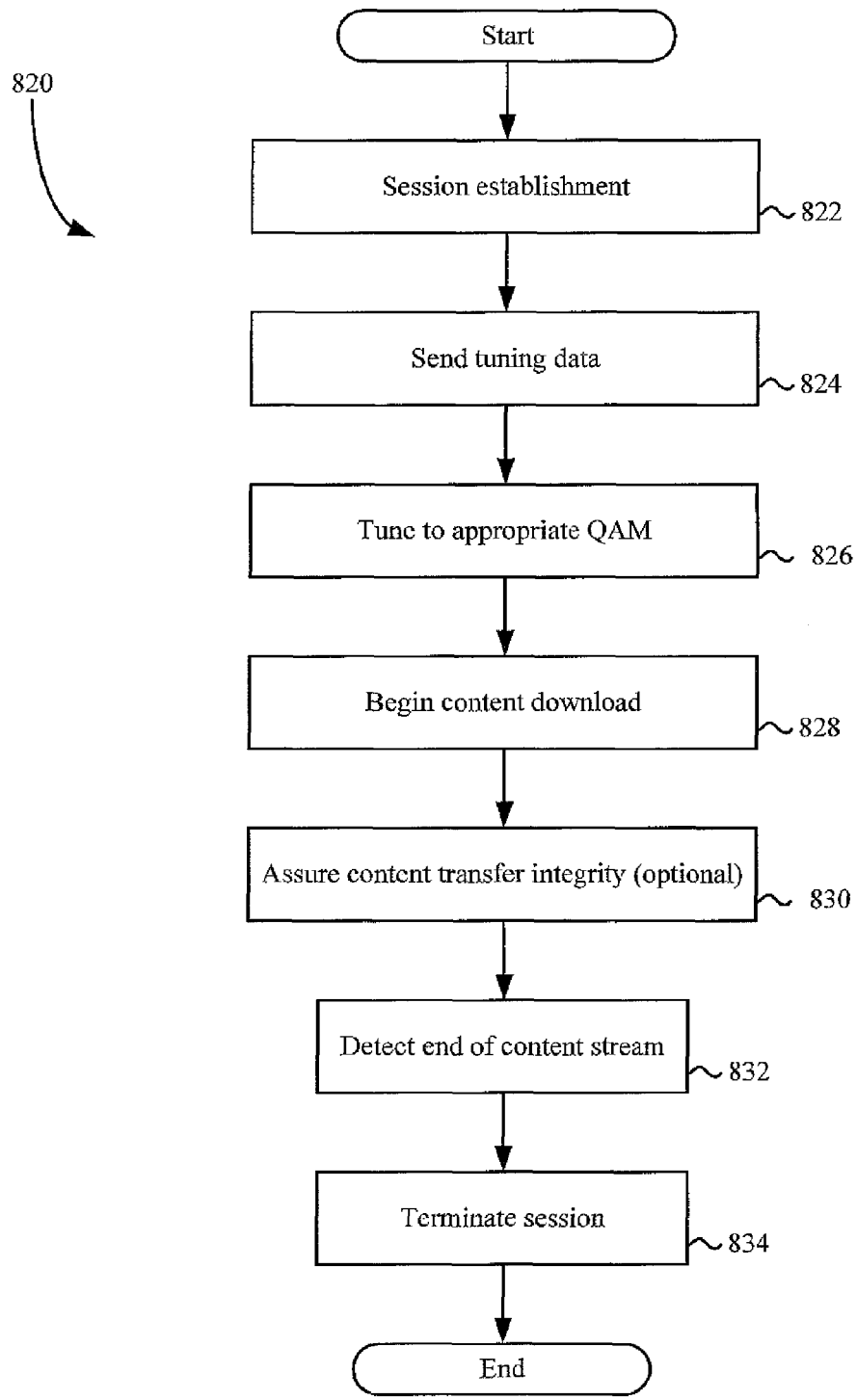
FIG. 8a is a logical flow diagram illustrating one embodiment of the method of directing the download of content from an on-demand server and/or from a segmented content controller according to the present invention.

Referring now to FIG. 8*a*, one exemplary embodiment of a generalized method by which the client application or portion 806 running on the digital processor 804 of the CPE 106 directs the download of content from an on-demand server (VOD server 105 or other on-demand server 304) as in the embodiments of FIGS. 3*a*-3*b*, and/or from an SCC 302 (via an application distribution server 104) as in the embodiment of FIG. 4, is described in detail.

A first step in performing the content download comprises the establishment of a session by which the content may be transferred (step 822). In the exemplary embodiment, the CPE 106 initiates an on-demand session for content download for a given asset ID. In cable networks compliant with the ISA specification, the session setup process is based on the well-known Session Setup Protocol (SSP), such as SSP Version 2.1. An asset ID (or offering ID) is used to identify the packetized data stream; this ID is accessed by the CPE 106 using, e.g., the on-demand catalog structures associated with an exemplary system and described with respect to FIGS. 7*a*-7*d* herein. Alternatively, some other structure or protocol adapted to transfer the necessary information to the CPE 106 can be utilized.

Upon successful setup of the session, the on-demand server (e.g., VOD server 105, or other on-demand server 304) or the SCC 302, at step 824, sends the CPE 106 information necessary for the CPE 106 to tune to the appropriate QAM (and MPEG program number that contains the data PID) used to transport the data. Since the CPE 106 requires the exact MPEG data PID in order to access the MPEG private section, it must parse the Program Map Table (PMT) to determine the data PID value associated with the MPEG program to which it is tuning.

After successful tuning to the physical channel(s) (step 826), the CPE 106 then begins receiving the content stream (step 828).

In the exemplary implementation, the client application 806 running on the CPE 106 starts the content stream by issuing the lightweight stream control protocol (LSCP) "Play" command to play from the zero (0) location. It will be appreciated that while an MPEG "private section" control approach is utilized in the illustrated embodiments, other approaches may be substituted with equal success such as, without limitation, a Digital Storage Media-Command and Control (DSM-CC) based stream control in accordance with ISO/IEC 13818-6:1998(E).

As the content stream begins flowing to the CPE 106, the client application 806 may optionally collect data regarding the receipt of the content stream to assure the integrity of the content transfer (step 830), and verify that there are no transmission errors therein. Error correction and/or retransmission protocols may be employed in such cases if desired. For example, if errors are noticed in the integrity of the content download, then the client application 806 may send a message to the source (either the on-demand server 105, 304 or the SCC 302) to correct the error. In response, the source will re-transmit those sections that were lost or damaged in transmission.

If the integrity of the content stream is not flawed, and/or if the system does not utilize the optional integrity check, then, upon detecting of end of the sequence (step 832), the client application 806 terminates the on-demand session by sending a session release request or similar communication (per step 834).

Myriad alternative schemes for managing the data download/CPE processing rates will be recognized by those of ordinary skill provided the present disclosure. For instance, in one alternative scheme, a high-speed download approach may be used, such as that described in co-owned U.S. patent application Ser. No. 11/013,665 entitled "Method and Apparatus for High Bandwidth Data Transmission in Content-Based Networks" filed Dec. 15, 2004, which issued as U.S. Pat. No. 8,522,293 on Aug. 27, 2013, and incorporated herein by reference in its entirety.

Utilization of One or More Content Libraries for nPVR Content—

Figure 9A:
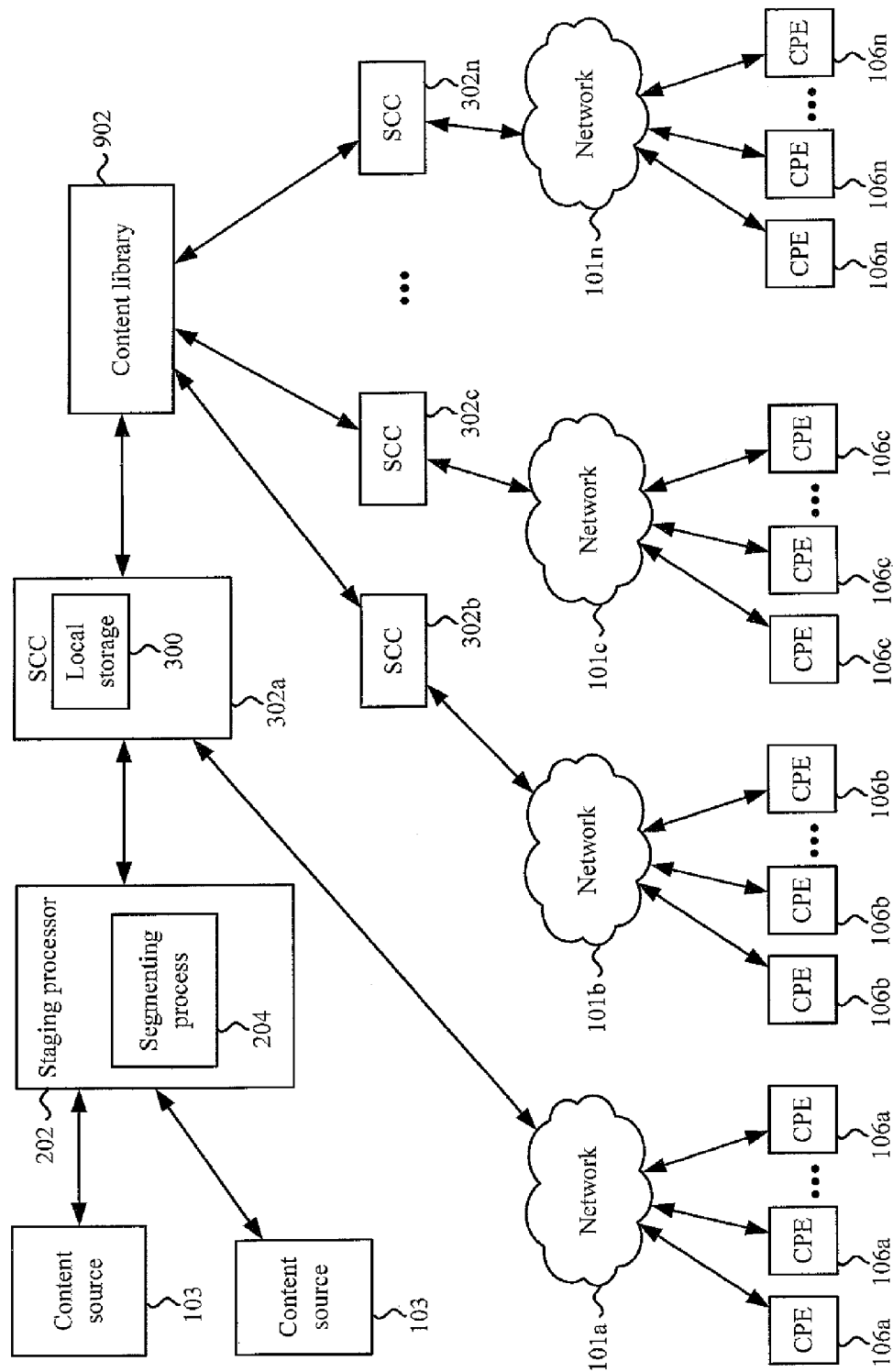
FIG. 9a is a functional block diagram illustrating another embodiment of a network configuration for storing and retrieving content using an nPVR delivery model according to the present invention.

Referring now to FIG. 9*a*, another exemplary system for storing and retrieving content in an nPVR model is illustrated. The system of FIG. 9*a* may be utilized in enabling both user-initiated nPVR functionality and/or MSO-initiated nPVR functionality (e.g., nPVR of content as it is simultaneously broadcast in order to enable users to begin the content over from its beginning during the broadcast window).

One salient aspect of the embodiment of FIG. 9*a* is the presence of a content library 902. As shown, content is received from one or more content sources 103 and processed as discussed above with respect to FIGS. 3*a*, 3*b*, and 4. The content is then sent via the network 101 to one or more CPE 106 associated with the network 101. In the embodiment of FIGS. 3*a* and 3*b*, this is accomplished via routing through an on-demand server 105, 304 (which are not shown in the simplified drawing of FIG. 9*a*). The content is simultaneously sent to a content library 902 once processed, etc. It is appreciated that although the simplified diagram of FIG. 9*a* depicts content entering the content library 902 via various SCC 302, any number of alternative configurations may be utilized consistent with the present invention, including, inter alia, wherein content is fed from a different network entity (e.g., VOD server 105, etc.) and/or wherein the system utilizes a BMS 107 as discussed previously herein with respect to the prior art.

In the illustrated embodiment, the content library 902 is central in nature as it is adapted to collect and distribute content from among multiple SCC 302*a*, 302*b*, 302*c* . . . 302*n* of different regions/headends. Accordingly, content on the SCC 302*a* of a first region will be available to that region and the entities associated therewith (such as the set of CPE 106*a*) as well as the other regions/headends.

In one embodiment the content collected by each SCC 302*a*, 302*b*, 302*c* . . . 302*n* will automatically be transmitted to the content library 902, which will catalog the content and present the catalog to all the CPE 106*a*, 106*b*, 106*c* . . . 106*n* serviced by the library 902. Accordingly, when a CPE 106*a*, 106*b*, 106*c* . . . 106*n* requests the content, the library 902 will stream the content directly to the requesting entity. However, if the requesting CPE 106 is associated with the region of the SCC 302 from which the stemmed, the content will be streamed from the SCC 302 or other network entity 101 (e.g., VOD server 105 or other on-demand server 304) associated therewith. For example, if content is received and processed by SCC 302a, then presented to the library 902 and subsequently requested by CPE 106a, the SCC 302a (or on-demand server 105, 304 associated with network 101a) will stream the content to the CPE 106a rather than the "centralized" content library 902. However, if it is requested by CPE 106c, the content library 902 will stream the content to the CPE 106c.

Alternatively, the content may be transmitted to the content library 902 only upon user request, and the library 902 acts as a conduit for the transmission of the content between two SCCs 302. According to this embodiment, content is collected and processed at each region/headend SCC 302a, 302b, 302c . . . 302n. The catalog of content for each SCC 302 is generated, updated, and published to the library 902. The various other regions/headends are able to view the catalogs of other regions/headends and provide the catalog listings to their associated CPE 106. When a CPE 106 requests content stored at a remote SCC 302, the "centralized" library 902 retrieves the requested content from the SCC 302 on which the requested content is stored and forwards the content to the SCC 302 of the requesting CPE 106. For example, if a particular content (Content A) is received and processed at SCC 302a, the SCC 302a will add the content to a content catalog which is sent to the content library 902. SCC 302b may then pull the catalog list and present it to its CPE 106b. If any one of the CPE 106b selects Content A, the request is sent to the content library 902 thorough the SCC 302b. The content library 902 requests and receives Content A from the SCC 302a on which it is located and sends the content to the library 902 for distribution to the SCC 302b and subsequently to the requesting CPE 106b.

In yet another embodiment (not shown), the content library 902 may merely deliver requests for content to the particular SCC 302 associated with requested content. According to this embodiment, content is collected, processed and cataloged. Then, each SCC's 302 cataloged content is sent to the content library 902. The catalogs in the library 902 are made available to all the SCC's 302 connected thereto, which in turn are made searchable by the CPE 106 associated with the various SCC 302. When a particular CPE 106a requests content which is available on a remote SCC 302b, a request for the content is sent via the SCC 302a associated with the CPE 106a to the content library 902. The library 902 forwards the request to the SCC 302b having the content causing it (SCC 302b) to begin to communicate with the SCC 302a of the requesting CPE 106a; i.e., causing the direct transfer of the content between the two entities (SCC 302a and 302b).

It is appreciated that in one variant of the present embodiment, requested content may be pulled from several SCCs 302 at once; the CPE 106 may be adapted to receive portions of the content from each SCC 302 and assemble the portions if necessary. See e.g., co-owned U.S. patent application Ser. No. 11/726,095 entitled "Method and Apparatus for Content Delivery and Replacement in a Network" filed Mar. 20, 2007 and incorporated herein by reference in its entirety, wherein a peer-to-peer (P2P) system for content distribution and replacement is described, disposed in exemplary embodiments at the edge of the content delivery network. Hence, in the context of the present embodiment, other CPE 106 or SCCs 302 can act as "peers" to a requesting CPE.

Figure 9B:
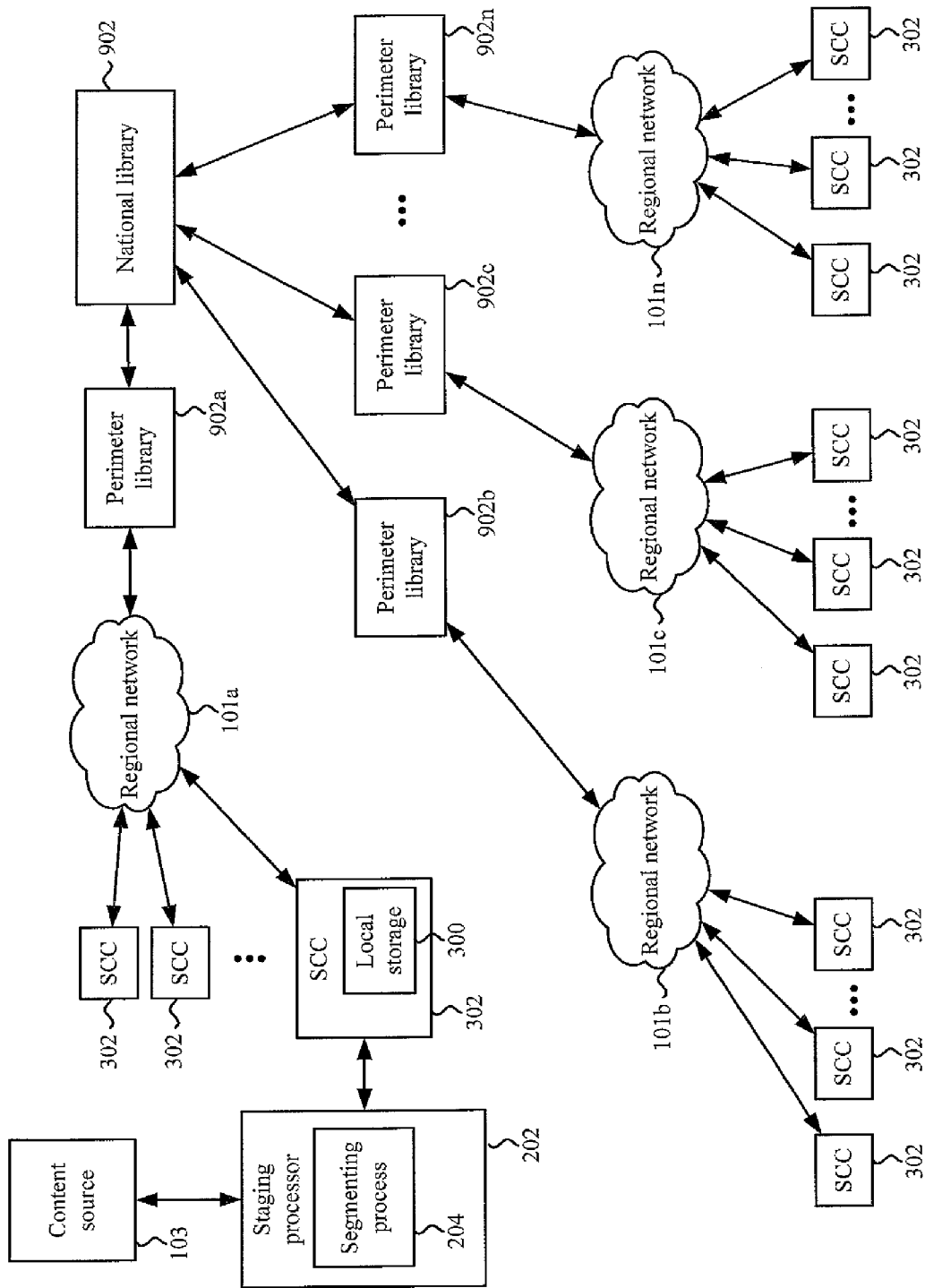
FIG. 9b is a functional block diagram illustrating yet another exemplary network configuration for storing and retrieving content in an nPVR system useful

Referring now to FIG. 9b, the above-mentioned content library 902, rather than being "centralized" in nature (i.e., one central content library 902), may comprise more than one entity. Specifically, the content library 902 may comprise a tiered system wherein various storage apparatus are disposed in close proximity to a particular region, termed "perimeter" or "edge" libraries 902. These edge libraries 902 are in communication at least one national-level library 902, as well as the headends 101 for the regions each is associated with. It is appreciated that in the embodiment of FIG. 9a, the perimeter libraries 902 will be disposed at different regions throughout the nation so as to offer programming from various regions across the country. Further, the perimeter libraries 902 may function as local centralized libraries (i.e., comprise functions similar to as those described above for the content library 902 of FIG. 9.)

Various other system configuration utilizing one or more content libraries 902 will also be appreciated by those of ordinary skill given the descriptions provided herein.

Content Library Architecture and Software—

Figure 9C:
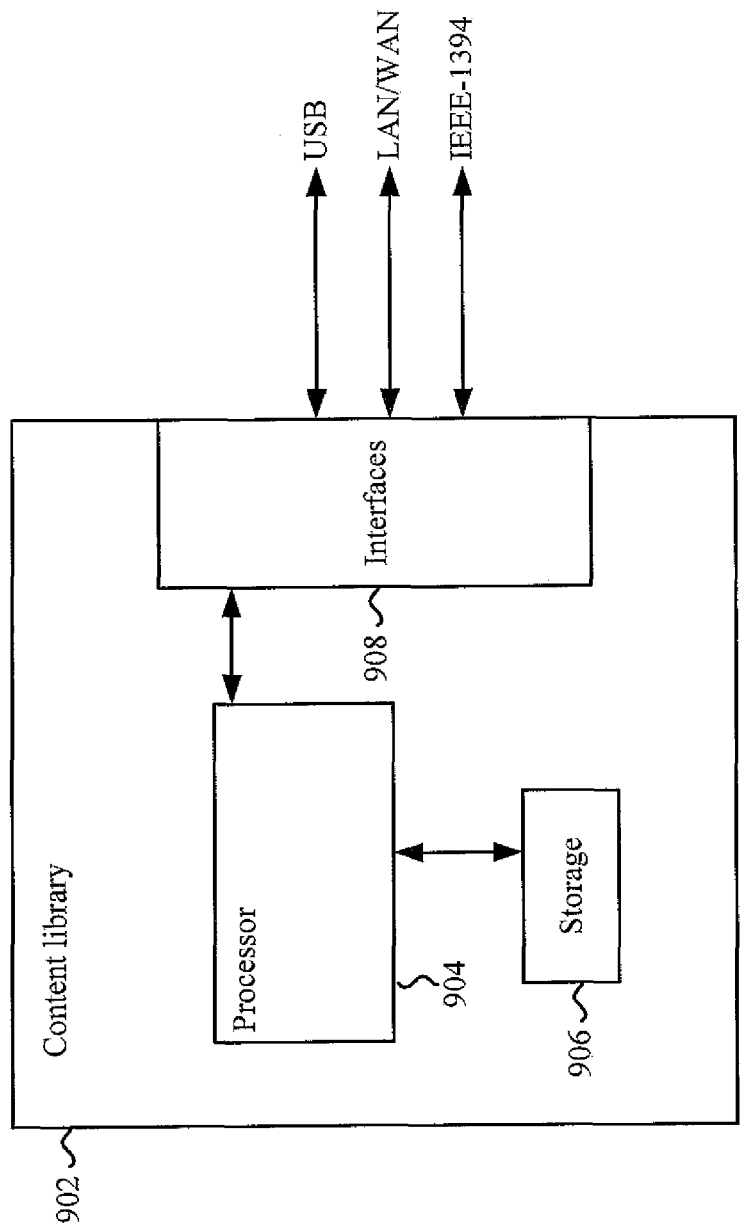

The components of the individual content libraries 902 of FIGS. 9a and 9b above (e.g., centralized, perimeter and national libraries 902) are depicted in the simplified block diagram of FIG. 9c. In one embodiment, a content library 902 comprises one or more mass storage devices 906 (e.g., RAID SATA drives, optical discs, etc.), a digital processor 904 and a plurality of interfaces 908 for connection to other devices in the network 101. The interfaces 908 also permit use of the content library 902 with other network apparatus such as LANs, routers and other packet network devices, network management and provisioning systems, local PCs, etc.

As noted above, the storage devices 906 of the content library 902 may be adapted to store a plurality of content from the various SCC 302 with which the library 902 is in data communication. Alternatively, the storage device 906 may be merely adapted to store requests for content sent from SCC 302 associated with the requesting CPE 106 to the SCC 302 on which requested content is stored. Various other configurations are also appreciated given the present disclosure.

The content libraries 902 may utilize other components, etc. well known to those of ordinary skill in the cable, computer and networking system fields, including e.g., amplifiers, board level electronic components, media processors, other specialized SoC or ASIC devices, and/or support for various processing layers and protocols (e.g., TCP/IP, 802.3, 802.16, 802.11, DHCP, SNMP, H.323/RTP/RTCP, VoIP, SIP, XMPP, LSCP, etc.).

As discussed above, the content libraries 902 may take any number of physical forms, comprising for example one of a plurality of discrete modules or cards within a larger network headend or edge device of the type well known in the art. The content libraries 902 may also comprise firmware, either alone or in combination with other hardware/software components such as those previously described (e.g., disposed in the aforementioned edge device). Numerous other configurations and components may be used and/or may be integrated with the content libraries 902 of the present invention.

The processor 904 of the content library 902 is adapted to run one or more software applications. These software applications include one or more applications adapted to facilitate the receipt and processing of requests for content (including forwarding requests where necessary). In one embodiment, one or more applications further enable the library 902 to establish communication with at least one SCC 302 in order to receive content therefrom and/or transmit content thereto. In yet another embodiment, the software applications enable the search and retrieval of content stored either on the content library 902 or on other entities in data communication therewith. It is appreciated that, in the following discussion, the content library may comprise a "centralized" and/or "perimeter" (or "edge") library 902 as discussed above with respect to FIGS. 9-9b.

Figure 10:
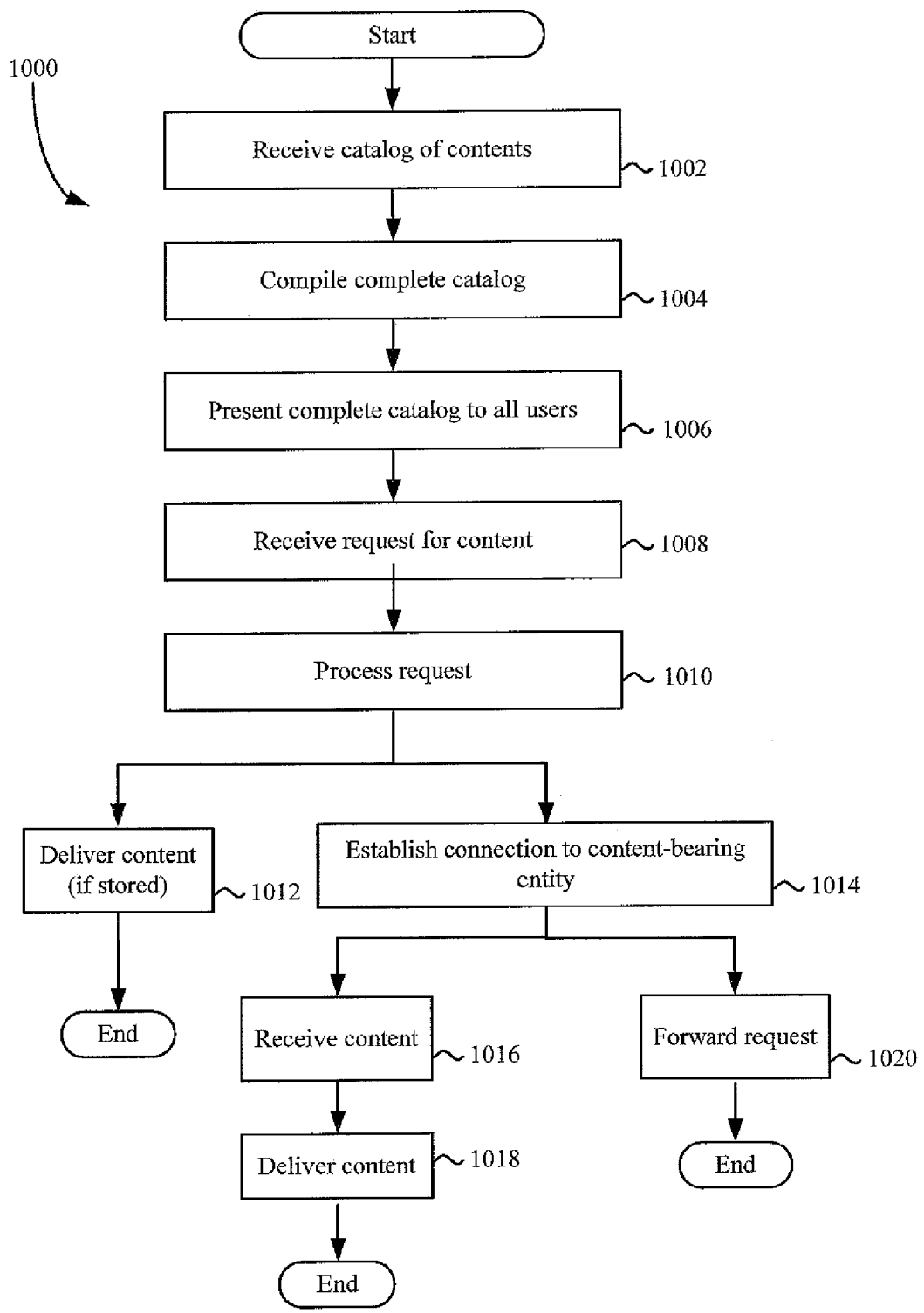
FIG. 10 is logical flow diagram illustrating one embodiment of the method of utilizing a content library in conjunction with the present invention.

One method 1000 by which the exemplary software applications accomplish the above-described receipt and search functionality is given in FIG. 10. As illustrated, at step 1002, a catalog of contents is received from each content-bearing entity (e.g., SCC 302, VOD server 105, etc.) in communication with the content library 902. The illustrated system appreciates that content may frequently be added and/or dropped from the content-bearing entities, thus altering which content is available. Accordingly, the catalog entries received at step 1002 may comprise periodically received catalog updates or entirely new catalogs.

At step 1004, all of the catalog entries received from each of the content-bearing entities in communication with the content library 902 are compiled to form a completed content catalog. The completed content catalog is then presented to all users (e.g., all CPE connected to the library 902 via one or more network 101 entities) at step 1006.

Per step 1008, a user will select one or more content from the content catalog and the user's selection will be received at the content library 902 in the form of a request. The library will then process the request (step 1010).

It is appreciated that, in one embodiment, content may also be sent from the content-bearing entities to the library 902 on an as-obtained basis. In other words, as the content-bearing entities collect content, they will, in one embodiment, automatically send a copy of the content to the library 902 for storage. Therefore, when a request for content is processed (at step 1010) the content library will deliver the content to the requesting user (at step 1012) directly from its storage.

Alternatively, at step 1014, the library 902 will establish a connection with the content-bearing entity associated with the content requested. If the library 902 is acting as a conduit, then, per step 1016 the library will receive the content from the content-bearing entity and subsequently (step 1018) deliver it to the requesting user. Alternatively, the library 902 may merely forward a request to receive content to one or more content-bearing entities (at step 1020) and allow the entities to establish connections and transfer content unaided.

Related and/or Targeted Secondary Content Delivery—

In another embodiment, the present invention may advantageously utilize various methods for the delivery and/or selection of targeted or related "secondary" content.

One such method for the delivery of contextually-related "secondary" content (e.g., advertising messages, useful informational links, etc.) in association with the primary content selected by the user is described in co-owned, co-pending U.S. patent application Ser. No. 11/198,620, filed Aug. 4, 2005 and entitled "Method and Apparatus for Context-Specific Content Delivery", which is incorporated herein by reference in its entirety. Specifically, that application discusses in one exemplary embodiment, secondary content comprising advertising selected at least in part based on metadata associated with the primary content. The metadata is generated by e.g., the SCC 302 (as discussed above), and is sent to a third party network entity (e.g., advertising server) which returns contextually specific advertising matching the search terms. The SCC 302 then assembles the matching advertisement segments and content segments into a continuous stream for presentation to the user upon request for nPVR content. In one variant, the search term is simply one or more keywords drawn from the metadata and used as an input to a search engine. In another variant, more sophisticated analysis of the metadata is performed so as to ostensibly reduce the number of irrelevant or marginally relevant "hits" returned by the search engine/advertising server.

Another method enhanced of advertising selection and delivery advantageously coupled with the aforementioned delivery of targeted primary content is described in co-owned, co-pending U.S. patent application Ser. No. 12/070,559, filed Feb. 19, 2008 and entitled "Method and Apparatus for Enhanced Advertising and Promotional Delivery in a Network", which is incorporated herein by reference in its entirety. Specifically, that application discusses, in one embodiment, enabling a viewer to individually preview and select the advertisements that they will view during play back of real-time broadcast nPVR content and/or user-initiated nPVR content, as well as during "trick mode" operation occurring during both. In one variant, the preview function leverages metadata that is found in the advertisements. The invention discloses an advertising controller (AC) which is utilized to select choices on the subscriber's advertising "playlist" based on, e.g., correlation between the advertising metadata and metadata associated with the nPVR content via the metadata file generated by the SCC 302 (discussed above).

In another aspect of the above-referenced invention, decoupling of advertising or promotions from nPVR programs is advantageously provided, thus affording the network operator flexibility to insert various advertising content options in a dynamic fashion based on inter alia changing network conditions, and/or cost/benefit decisions, or selectively replace dated, expired or under-performing advertisements, or those having less correlation to a current program content stream.

In another variant, advertising or commercial skipping is substantially frustrated by presenting a viewer with several viewing options of potential interest, and/or imposing one or more minimum viewing policies.

Business Methods and Considerations—

Various exemplary business-related aspects and methods of present invention are now described in detail.

In one embodiment, access to the various aspects of the improved nPVR system is provided as an incentive or featured as part of the subscriber's subscription plan. In other words, a certain level of subscriber may be able to access MSO-initiated nPVR content, while another level of subscriber may be able to only perform user-initiated nPVR tasks (or vice versa).

Using the present invention to obviate expensive storage under prior art VOD approaches as previously described herein may also allow the MSO to offer the nPVR functionality at a lower cost to the subscriber, thereby providing a competitive edge or greater incentive for the subscriber to utilize the service.

In another embodiment, the user's ability to access content pulled across one or more libraries 902 (such as centralized library, perimeter library and national-level library) will be restricted across different subscription plans, etc.

It is also noted that an MSO may utilize the ability of the present invention to insert secondary content (including targeted secondary content) into the nPVR content as a business model with respect to advertisers. In other words, certain advertisers may pay a higher premium to have their advertising content associated with a greater quantity or a more diverse subset of viewers, or more "impressions". The MSO offers a unique capability in this regard; i.e., having demographic knowledge of the same population of viewers who will view the advertising or other secondary content, versus merely population-wide demographics (e.g., Nielsen or the like), wherein viewers may or may not be the same individuals from which the demographic data was drawn.

Other business-related aspects of the present invention may be appreciated given the foregoing disclosure.

Operations/Business Rules Engine—

In another aspect of the invention, the aforementioned processor 702 running on the SCC 302 (one or more computer programs located thereon) includes a so-called "rules" engine. These rules may be fully integrated within various entities associated with the present invention, or may be controlled via e.g., the user's CPE 106 or a network administration function (e.g., a networked management PC and associated software). In effect, the rules engine comprises a supervisory entity which monitors and selectively controls the content recommendation functions at a higher level, so as to implement desired operational or business rules. The rules engine can be considered an overlay of sorts to the remote content management and delivery algorithms. For example, it may invoke certain operational protocols or decision processes based on requests received from the user or SCC, on subscriber data, geographic data, etc. However, these processes may not always be compatible with higher level business or operational goals, such as maximizing profit or system reliability. Hence, when imposed, the business/operational rules can be used to dynamically (or manually) control the operation of the nPVR system.

The rules may be, e.g., operational or business-oriented in nature, or related to preservation of security, and may also be applied selectively in terms of time of day, duration, specific local areas, or even at the individual user level.

For example, one rule implemented by the rules engine may comprise providing priority access to the national content library 902 to certain classes of subscribers (e.g., those at a premium level of service, or subscribers who have "opted-in" to receiving access), especially when library or network resources are in contention.

In another example, network bandwidth may be allocated depending on the requesting subscriber's service class, options, and delivery paradigm. For instance, subscriber-requested nPVR might be given a lower bandwidth allocation priority than VOD, but greater than broadcast switched delivery (BSA) or the like. Any number of different permutations of this theme will be recognized by those of ordinary skill given this disclosure, including those based on profit or revenue to the MSO (or its advertisers). See e.g., co-owned U.S. patent application Ser. No. 12/072,637 entitled "Methods and Apparatus for Business-Based Network Resource Allocation" filed Feb. 26, 2008, issued as U.S. Pat. No. 8,813,143 on Aug. 19, 2014, and incorporated herein by reference in its entirety, which discloses inter alia methods and apparatus for the "intelligent" optimization of content-based network operation based on, e.g., cost and/or revenue implications in the context of "on-demand" video services such as e.g., VOD, FOD, SVOD, and HDOD, as well as optionally from a more global perspective (e.g., on-demand, switched broadcast, and high-speed data/cable modem services considered as a whole).

In still another example, a rule implemented by the rules engine may comprise imposing a moratorium on allowing access to MSO-initiated nPVR content for a certain period after the broadcast window of the real-time broadcast has ended. This may be based on processing or operational considerations, or alternatively restrictions desired by the MSO or content source (e.g., studio or network), such as where temporal aspects of the delivery are critical. For instance, this approach can be used to allow only certain segments of the country to see certain events, etc. after they have been broadcast in other regions; e.g., so as not to "spoil" the ending, affect voter sentiments in elections, etc.

In yet another example, access to "trick mode" functionality may be barred at certain instances during the playback of nPVR content.

Many other approaches and combinations are envisaged consistent with the invention, as will be recognized by those of ordinary skill when provided this disclosure.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. This description is in no way meant to be limiting, but rather should be taken as illustrative of the general principles of the invention. The scope of the invention should be determined with reference to the claims.

What is claimed is:

1. A method for delivery of content via a network personal video recorder in a content delivery network, said method comprising:
   ingesting said content via a network-initiated determination, in real-time;
   processing said content, said processing comprising:
      segmenting said content into a plurality of elements, each of said segmented plurality of elements comprising at least one splice point;
      creating a virtual file comprising a plurality of pointers, each associated to a physical location of a storage block for storing respective ones of said plurality of elements of said content, said virtual file stored with said content; and
      removing one or more discontinuity artifacts between one or more of said segmented plurality of elements in real-time by transcoding only data near said at least one splice point in said segmented plurality of elements;
   storing said segmented content elements;
   receiving a request for at least a portion of said content;
   generating a content stream using at least a portion of said content elements;
   sending said content stream to one or more users;
   during said act of sending said content stream to said one or more users, monitoring a transmission rate of said act of sending and a number of retransmission requests by said one or more users;
   determining a transmission efficiency based, at least in part, on said transmission rate and said number of retransmission requests by said one or more users; and
   adjusting said transmission rate when said determined transmission efficiency is less than a threshold level.

2. The method of claim 1, wherein said act of segmenting comprises cutting said content stream at one or more I-frame boundaries.

3. The method of claim 1, wherein said act of generating said content stream comprises at least assembling said segmented content elements with one or more advertisement segments.

4. The method of claim 3, wherein said act of generating said content stream further comprises transcoding said assembled content elements and said one or more advertisement segments.

5. The method of claim 3, further comprising generating metadata regarding said stored content elements.

6. The method of claim 5, wherein said one or more advertisement segments are selected based at least in part on a comparison of metadata associated with said advertisement segments and said metadata regarding said stored content elements.

7. The method of claim 1, wherein said act of sending said content stream to said one or more users comprises sending said content stream to an on-demand server.

8. The method of claim 1, wherein said act of sending said content stream to said one or more users comprises sending said content stream to a content library.

9. The method of claim 1, wherein said act of ingesting said content is performed at least in part in response to receipt of at least one user request.

10. The method of claim 1, wherein said act of ingesting said content is performed based at least in part on receipt of at least a cable network provider request.

11. The method of claim 1, wherein said act of storing comprises storing said segmented content elements on a commercial off-the-shelf (COTS) storage device.

12. A system for acquisition and distribution of content in a content delivery network, said system comprising:
at least one staging processor adapted to:
acquire first content;
identify a plurality of I-frames within said acquired first content;
generate a plurality of segments of said acquired first content by a division of said acquired first content at one or more of said plurality of identified I-frames; and
insert additional content between individual ones of said plurality of segments to generate second content;
at least one storage entity, said storage entity adapted to store said second content;
at least one local video on demand (VOD) server entity, said VOD server entity adapted to:
upon request for said first content from a requesting device, request and receive said second content from said storage entity;
generate a content stream via at least portions of said second content;
distribute said content stream via said network to said requesting device
monitor a transmission rate of said distribution of said content stream;
evaluate a number of retransmission requests by said requesting device;
determine a transmission efficiency based, at least in part, on said transmission rate and said number of retransmission requests; and
adjust said transmission rate based on said determined transmission efficiency.

13. The system of claim 12, wherein said system further comprises one or more on-demand servers, said on-demand servers adapted to receive and transmit said content stream to at least one CPE associated with said network.

14. The system of claim 12, wherein said system further comprises at least one content library, said content library adapted to:
receive a request for content from at least one CPE associated with said network; and
establish a mechanism for delivery of said requested content to said at least one CPE.

15. The system of claim 14, wherein said mechanism for said delivery of said requested content comprises a request from said content library for said requested content from said at least one local server entity, and deliver of said requested content to said at least one CPE.

16. The system of claim 14, wherein said mechanism for said delivery of said requested content comprises receipt at least one local server entity of said request forwarded from said content library, and said at least one local server entity enabled to communicate with said at least one CPE via said forwarded request.

17. The system of claim 14, wherein said generation of said content stream comprises at least assembly of said segmented content with onr or more advertisement segments.

18. The system of claim 17, wherein said generation of said content stream further comprises generation of a transcoded version of said assembled content and advertisement segments.

19. The system of claim 17, wherein said at least one local server entity is further adapted to generate metadata regarding said stored content.

20. The system of claim 19, wherein said one or more advertisement segments are selected based at least in part on a comparison of metadata associated with said advertisement segments and said metadata regarding said stored content.

21. The system of claim 12, wherein distribution of said content stream comprises delivery of said content stream to an on-demand server.

22. The system of claim 12; Wherein said distribution of said content stream comprises delivery of said content stream directly to at least one CPE associated with said network.

23. A method for delivery of content via a network personal video recorder in a content distribution network, said method comprising:
receiving a request for content specific to a geographic region to which a first apparatus is associated from a centralized content library on behalf of a second apparatus not associated with said specific geographic region;
ingesting said content based on said request;
processing said content, said processing comprising segmenting said content into a plurality of elements, and creating a virtual file comprising at least one pointer associated with a physical location of a chapter storage block of said content;
storing said segmented content elements and said virtual file;
generating a content stream using at least a portion of said content elements;
despite said second apparatus not being associated to said specific region, sending said content stream to said centralized content library, said centralized content library configured to provide said content to said second apparatus;
monitoring, during said act of sending said content stream, a transmission rate thereof:
determining a number of retransmission requests by said centralized content library; and adjusting said transmission rate based on a transmission efficiency, said transmission efficiency being based at least in part on said transmission rate and said number of retransmission requests.

24. The method of claim 23, wherein said act of segmenting comprises cutting said content stream at one or more boundaries.

25. The method of claim 23, wherein said act of generating said content stream comprises at least assembling said segmented content elements with one or more advertisement segments.

26. The method of claim 25, wherein said act of generating said content stream further comprises transcoding said assembled content elements and said one or more advertisement segments.

27. The method of claim 25, further comprising generating metadata regarding said stored content elements.

28. The method of claim 27, wherein said one or more advertisement segments are selected based at least in part on a comparison of metadata associated with said advertisement segments and said metadata regarding said stored content elements.

29. The method of claim 23, wherein said act of sending said content stream to said one or more users comprises sending said content stream to an on-demand server.

30. The method of claim 23, wherein said act of sending said content stream to said one or more users comprises sending said content stream to a content library.

31. An apparatus for storage and distribution of content in a network personal video recorder (nPVR) system of a content delivery network, said apparatus comprising:
   an interface, said interface adapted to enable said apparatus to receive and distribute said content;
   a storage entity, said storage entity adapted to store said content; and
   a processing entity, said processing entity adapted to run at least one computer program thereon, said computer program comprising a plurality of instructions which are adapted to, when executed, enable said apparatus to:
      receive a request for content specific to a geographic region to which said apparatus is associated from a centralized content library on behalf of a second apparatus not associated to said specific geographic region;
      ingest said content based on said request;
      process said content via segmentation of said content into a plurality of elements, and creation of a virtual file comprising at least one pointer associated with a physical location of a chapter storage block of said content;
      store said segmented content elements and said virtual file;
      generate a content stream based at least in part on said content;
      despite a determination that said second apparatus is not associated to said specific region, provide said content stream to said centralized content library, said centralized content library configured to communicate said content stream to said second apparatus;
      monitor a transmission rate of said provision of said content stream and a number of retransmission requests by said centralized library; and
      adjust said transmission rate based on a transmission efficiency, said transmission efficiency being based at least in part on said transmission rate and said number of retransmission requests.

32. The apparatus of claim 31, wherein said storage entity comprises one or more commodity-based storage entities.

33. The apparatus of claim 32, wherein said one or more commodity-based storage entities each comprise hardware-assisted flash memory-based storage devices.

34. The apparatus of claim 32, wherein said content comprises content segments which have been cut at I-frame boundaries.

35. The apparatus of claim 34, wherein said generation of said content stream comprises assembly of said content segments and one or more advertisement segments to form a single content segment.

36. The apparatus of claim 35, wherein said plurality of instructions are further adapted to enable said apparatus to transcode said assembled content segments and said one or more advertisement segments.

37. The apparatus of claim 35, wherein;
   said plurality of instructions are further adapted to enable said apparatus to generate metadata regarding said stored content; and
   wherein said one or more advertisement segments are selected based at least in part on a comparison of metadata associated with said one or more advertisement segments and said metadata regarding said stored content.

38. The apparatus of claim 31, wherein communication of said content comprises communication of said content to an on-demand server.

39. The apparatus of claim 31, wherein communication of said content comprises communication of said content to another apparatus for storage and distribution of content.

* * * * *